United States Patent
Nago

(10) Patent No.: US 10,427,750 B2
(45) Date of Patent: Oct. 1, 2019

(54) BICYCLE DISC BRAKE CALIPER ASSEMBLY

(71) Applicant: Shimano Inc., Sakai, Osaka (JP)

(72) Inventor: Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 40 days.

(21) Appl. No.: 15/483,635

(22) Filed: Apr. 10, 2017

(65) Prior Publication Data

US 2018/0290707 A1    Oct. 11, 2018

(51) Int. Cl.

| | |
|---|---|
| *B62L 1/00* | (2006.01) |
| *B62K 19/38* | (2006.01) |
| *F16D 65/00* | (2006.01) |
| *F16D 55/228* | (2006.01) |
| *F16D 65/092* | (2006.01) |
| *F16D 65/18* | (2006.01) |
| *F16D 121/04* | (2012.01) |
| *F16D 125/04* | (2012.01) |
| *F16D 125/06* | (2012.01) |
| *F16D 65/02* | (2006.01) |
| *F16D 65/78* | (2006.01) |

(52) U.S. Cl.
CPC ............ *B62L 1/005* (2013.01); *B62K 19/38* (2013.01); *F16D 55/228* (2013.01); *F16D 65/0056* (2013.01); *F16D 65/0068* (2013.01); *F16D 65/092* (2013.01); *F16D 65/18* (2013.01); *F16D 2065/1396* (2013.01); *F16D 2065/789* (2013.01); *F16D 2121/04* (2013.01); *F16D 2125/04* (2013.01); *F16D 2125/06* (2013.01)

(58) Field of Classification Search
CPC .. F16D 65/18; F16D 2121/04; F16D 65/0068; F16D 2125/06; F16D 65/092; F16D 65/095; F16D 65/567; F16D 2055/0008; F16D 65/02; F16D 65/0056; F16D 2065/1392; F16D 65/09; B62L 1/00; B62L 1/005
USPC ........................................................ 188/72.4
See application file for complete search history.

(56) References Cited

U.S. PATENT DOCUMENTS

| | | | | |
|---|---|---|---|---|
| 4,022,297 A | * | 5/1977 | Haraikawa | ................ B62L 1/00 188/26 |
| 5,979,609 A | * | 11/1999 | Tsai | .......................... B62L 1/00 188/26 |
| 6,148,964 A | * | 11/2000 | Huang | ....................... B62L 1/00 188/218 XL |
| 6,230,849 B1 | | 5/2001 | Lumpkin | |
| 6,334,513 B1 | * | 1/2002 | Chern | ....................... B62L 3/00 188/71.7 |
| 6,334,514 B1 | * | 1/2002 | Kirimoto | ............... B60T 1/065 188/344 |

(Continued)

*Primary Examiner* — Bradley T King
*Assistant Examiner* — Mahbubur Rashid
(74) *Attorney, Agent, or Firm* — Global IP Counselors, LLP

(57) ABSTRACT

A bicycle disc brake caliper assembly is basically provided with a main caliper body, at least one brake pad and a mounting adapter. The main caliper body includes a first coupling portion that is configured not to be directly attached to a bicycle frame. The at least one brake pad is movably attached to the main caliper body. The mounting adapter includes a second coupling portion that is configured to be detachably coupled to the first coupling portion, and a mounting portion that is configured to be mounted to a bicycle frame.

14 Claims, 16 Drawing Sheets

(56) References Cited

U.S. PATENT DOCUMENTS

| | | | |
|---|---|---|---|
| 6,336,526 B1 | 1/2002 | Chou | |
| 6,520,297 B1* | 2/2003 | Lumpkin | B60T 11/046 |
| | | | 188/24.15 |
| 6,557,671 B1* | 5/2003 | Kirimoto | B60T 11/046 |
| | | | 188/26 |
| 6,745,874 B1 | 6/2004 | Huang | |
| 6,945,369 B1* | 9/2005 | Chen | B62L 1/005 |
| | | | 188/205 R |
| 6,959,790 B2* | 11/2005 | Huang | B60T 8/3225 |
| | | | 188/24.19 |
| 7,007,776 B1 | 3/2006 | Lin | |
| 7,318,502 B2* | 1/2008 | Costa | B62K 19/38 |
| | | | 188/24.22 |
| 7,478,707 B2* | 1/2009 | Choon Chye | B60T 11/046 |
| | | | 188/26 |
| 9,309,938 B2 | 4/2016 | Nakakura | |
| 9,771,125 B1* | 9/2017 | Kuo | B62L 3/02 |
| 2003/0010580 A1* | 1/2003 | Nakamura | B62L 1/005 |
| | | | 188/73.31 |
| 2003/0168293 A1* | 9/2003 | Kariyama | B62L 1/005 |
| | | | 188/72.1 |
| 2003/0183463 A1* | 10/2003 | Wu | B62L 1/005 |
| | | | 188/73.31 |
| 2004/0188186 A1* | 9/2004 | Chen | B62L 1/00 |
| | | | 188/26 |
| 2005/0039989 A1* | 2/2005 | Huang | B60T 8/3225 |
| | | | 188/26 |
| 2005/0269166 A1* | 12/2005 | Chen | B62L 1/005 |
| | | | 188/26 |
| 2007/0278055 A1* | 12/2007 | Chen | B62K 19/38 |
| | | | 188/2 D |
| 2010/0230199 A1* | 9/2010 | Roth | B62K 19/38 |
| | | | 180/219 |
| 2013/0048444 A1* | 2/2013 | Hirotomi | B60T 7/102 |
| | | | 188/73.31 |
| 2013/0133991 A1 | 5/2013 | Thomas | |
| 2015/0001012 A1* | 1/2015 | Noborio | B62L 1/005 |
| | | | 188/72.4 |
| 2015/0001014 A1* | 1/2015 | Noborio | B62L 1/005 |
| | | | 188/73.31 |
| 2015/0240892 A1* | 8/2015 | Wei | F16D 55/225 |
| | | | 188/72.9 |
| 2015/0308524 A1* | 10/2015 | Nakakura | B62L 1/005 |
| | | | 188/71.1 |
| 2015/0360744 A1* | 12/2015 | Noborio | B62L 1/005 |
| | | | 188/26 |
| 2016/0169428 A1* | 6/2016 | Nakakura | B62J 23/00 |
| | | | 188/26 |

* cited by examiner

BICYCLE DISC BRAKE CALIPER ASSEMBLY

BACKGROUND

Field of the Invention

This invention generally relates to a bicycle disc brake caliper assembly. More specifically, the present invention relates to a bicycle disc brake caliper assembly having a mounting adapter for mounting a main caliper body to a bicycle frame.

Background Information

Generally, there are several types of bicycle brake devices currently available on the market. Examples of some types of common bicycle brake devices include rim brakes and disc brakes. Disc brake systems provide substantial braking power in relation to the amount of braking force applied to the brake lever. Moreover, disc brake systems typically provide a high level of braking consistency in all types of weather and riding conditions. Disc brake systems can be either cable operated or hydraulically operated.

SUMMARY

In recent years, some bicycle fork manufacturers and some bicycle frame manufacturers have changed the mounts for attaching a bicycle disc brake caliper assembly. Generally, the present disclosure is directed to various features of a bicycle disc brake caliper assembly having one or more mounting adapters for mounting a main caliper body to one or more bicycle frames.

In view of the state of the known technology and in accordance with a first aspect of the present disclosure, a bicycle disc brake caliper assembly is basically provided that comprises a main caliper body, at least one brake pad and a mounting adapter. The main caliper body includes a first coupling portion that is configured not to be directly attached to a bicycle frame. The at least one brake pad is movably attached to the main caliper body. The mounting adapter includes a second coupling portion configured to be detachably coupled to the first coupling portion, and a mounting portion configured to be detachably mounted to a bicycle frame.

Advantageously according to the first aspect of the present invention, the bicycle disc brake caliper assembly can be easily and inexpensively mounted to different bicycle frames.

In accordance with a second aspect of the present invention, the bicycle disc brake caliper assembly according to the first aspect is configured so that the mounting portion includes a first mounting part disposed on a first side of the second coupling portion, and a second mounting part disposed on a second side of the second coupling portion. The second side is opposite to the first side with respect to the second coupling portion.

Advantageously according to the second aspect of the present invention, the bicycle disc brake caliper assembly can be securely mounted to a bicycle frame.

In accordance with a third aspect of the present invention, the bicycle disc brake caliper assembly according to the second aspect is configured so that the first mounting part includes a first mounting bore defining a first mounting axis, and the second mounting part includes a second mounting bore defining a second mounting axis.

Advantageously according to the third aspect of the present invention, the bicycle disc brake caliper assembly can be securely mounted to a bicycle frame using conventional fasteners.

In accordance with a fourth aspect of the present invention, the bicycle disc brake caliper assembly according to the third aspect is configured so that the first mounting axis is parallel to the second mounting axis.

Advantageously according to the fourth aspect of the present invention, the bicycle disc brake caliper assembly can be easily mounted to a bicycle frame.

In accordance with a fifth aspect of the present invention, the bicycle disc brake caliper assembly according to the fourth aspect is configured so that the first mounting axis is spaced by a first distance from the second coupling portion as measured along a minimum straight line connecting the first and second mounting axes, and the second mounting axis is spaced by a second distance from the second coupling portion as measured along the minimum straight line. The second distance is greater than the first distance.

Advantageously according to the fifth aspect of the present invention, the mounting adapter can be used to mount the main caliper body to a bicycle frame for use with two different sizes of brake rotors.

In accordance with a sixth aspect of the present invention, the bicycle disc brake caliper assembly according to any one of the third to fifth aspect is configured so that the main caliper body includes a hydraulic cylinder in which a piston movably disposed along a movement axis that is non-parallel to the first mounting axis.

Advantageously according to the sixth aspect of the present invention, a strong and stable braking power can be obtained using hydraulically operated caliper.

In accordance with a seventh aspect of the present invention, the bicycle disc brake caliper assembly according to the sixth aspect is configured so that the movement axis is perpendicular to the first mounting axis as seen in a direction perpendicular to both the movement axis and the first mounting axis.

Advantageously according to the seventh aspect of the present invention, the main caliper body can be conveniently positioned with respect to a bicycle frame.

In accordance with an eighth aspect of the present invention, the bicycle disc brake caliper assembly according to any one of the third to seventh aspects is configured so that the first mounting part includes a first bicycle mounting surface having a first opening of the first mounting bore, and the second mounting part includes a second bicycle mounting surface having a second opening of the second mounting bore, the first and second bicycle mounting surfaces lying in a mounting plane.

Advantageously according to the eighth aspect of the present invention, the bicycle disc brake caliper assembly can be securely mounted to a bicycle frame with a low profile.

In accordance with a ninth aspect of the present invention, the bicycle disc brake caliper assembly according to the eighth aspect is configured so that the first mounting bore has a first internal thread engaged with a first external thread of a first fastener, and the second mounting bore has a second internal thread engaged with a second external thread of a second fastener.

Advantageously according to the ninth aspect of the present invention, the bicycle disc brake caliper assembly can be securely mounted to a bicycle frame using conventional threaded fasteners.

In accordance with a tenth aspect of the present invention, the bicycle disc brake caliper assembly according to the eighth or ninth aspect is configured so that no portion of the mounting adapter between the first opening and the second opening extends beyond the mounting plane in a direction toward the bicycle frame.

Advantageously according to the tenth aspect of the present invention, the bicycle disc brake caliper assembly can be securely mounted to a bicycle frame with a low profile.

In accordance with an eleventh aspect of the present invention, the bicycle disc brake caliper assembly according to the eighth aspect is configured so that the mounting adapter has a protruding part between the first opening and the second opening extending beyond the mounting plane in a direction toward the bicycle frame.

Advantageously according to the eleventh aspect of the present invention, the bicycle disc brake caliper assembly can be securely mounted to a bicycle frame having a pair of mounting posts while maintaining a low profile.

In accordance with a twelfth aspect of the present invention, the bicycle disc brake caliper assembly according to any one of the first to eleventh aspects is configured so that the first coupling portion of the main caliper body includes one of a clamp and a projection, and the second coupling portion of the mounting adapter includes other of the clamp and the projection.

Advantageously according to the twelfth aspect of the present invention, the main caliper body can be easily attached and detached from the mounting adapter.

In accordance with a thirteenth aspect of the present invention, the bicycle disc brake caliper assembly according to the twelfth aspect is configured so that the main caliper body includes the projection, and the mounting adapter includes the clamp having a projection receiving opening to clamp the projection therein.

Advantageously according to the thirteenth aspect of the present invention, the main caliper body and the mounting adapter can be easily manufactured with affordable cost.

In accordance with a fourteenth aspect of the present invention, the bicycle disc brake caliper assembly according to the thirteenth aspect is configured so that the clamp has a clamping portion defining the projection receiving opening and a clamping fastener operatively coupled to the clamping portion to adjust a size of the projection receiving opening.

Advantageously according to the fourteenth aspect of the present invention, the main caliper body can be easily attached and detached from the mounting adapter.

In accordance with a fifteenth aspect of the present invention, the bicycle disc brake caliper assembly according to the thirteenth or fourteenth aspect is configured so that the projection receiving opening defines a pivot axis, and the mounting adapter adjustably supports the main caliper body about the pivot axis between at least two different mounting positions.

Advantageously according to the fifteenth aspect of the present invention, the main caliper body can be conveniently positioned with respect to a bicycle frame.

In accordance with a sixteenth aspect of the present invention, the bicycle disc brake caliper assembly according to any one of the first to fifteenth aspects further comprises an additional mounting adapter interchangeable with the mounting adapter. The additional mounting adapter has a different mounting portion with respect to the mounting portion of the mounting adapter. The different mounting portion is configured to be mounted to a different bicycle frame with respect to the bicycle frame used with the mounting adapter.

Advantageously according to the sixteenth aspect of the present invention, the bicycle disc brake caliper assembly can be easily and inexpensively mounted to different bicycle frames Also, other objects, features, aspects and advantages of the disclosed bicycle disc brake caliper assembly will become apparent to those skilled in the art from the following detailed description, which, taken in conjunction with the annexed drawings, discloses one embodiment of the bicycle disc brake caliper assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
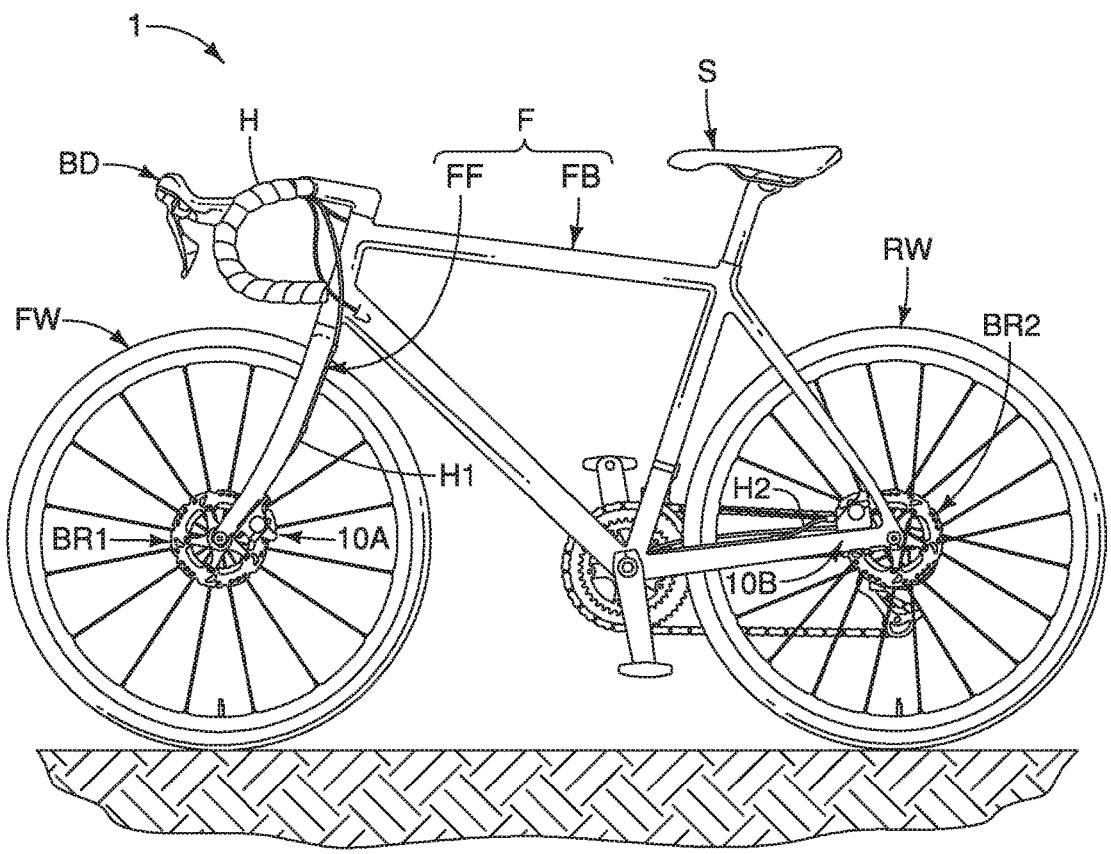
FIG. 1 is a side elevational view of a bicycle that is equipped with two bicycle disc brake caliper assemblies having same disc brake calipers in accordance with one illustrated embodiment.

Referring initially to FIG. 1, a bicycle 1 is illustrated having a bicycle frame F that is equipped with a bicycle disc brake caliper assembly 10A and a bicycle disc brake caliper assembly 10B in accordance with one illustrative embodiment.

Bicycles and their various components are well-known in the prior art, and thus, bicycle 1 and its various components will not be discussed or illustrated in detail herein. Rather, the bicycle 1 and its various components will only be discussed to the extent needed to understand the bicycle disc brake caliper assemblies 10A and 10B.

Basically, the bicycle frame F has a frame body FB and a front fork FF. The front fork FF is pivotally supported by the frame body FB to pivot about an inclined vertical axle in the front portion of the frame body FB. Here, the bicycle 1 is illustrated as a road bicycle. The bicycle 1 further comprises a drop handlebar H that is coupled to the front fork FF, and a saddle or seat S that is coupled to the frame body FB. The front fork FF rotatably supports a front wheel FW at the lower end of the front fork FF. The front wheel FW has a front brake rotor BR1 that is attached to a hub of the front wheel FW so that the front brake rotor BR1 rotates integrally with the front wheel FW. The frame body FB rotatably supports a rear wheel RW that is rotatably supported on a rear portion of the frame body FB. The rear wheel RW has a rear brake rotor BR2 that is attached to a hub of the rear wheel RW so that the rear brake rotor BR2 rotates integrally with the rear wheel RW. The bicycle 1 can be a mountain style bicycle or city style bicycle that has a flat style handlebar.

Figure 2:
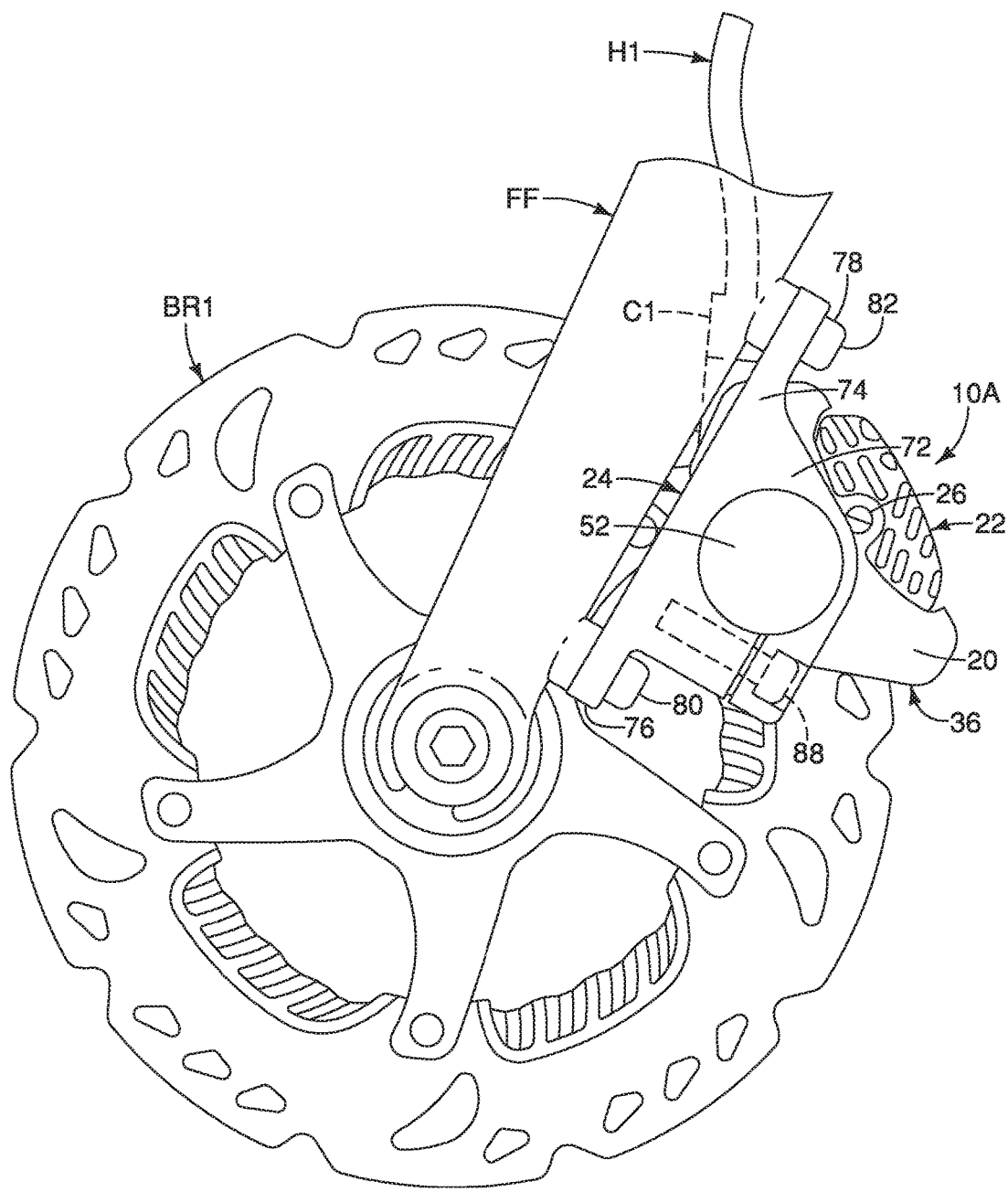
FIG. 2 is an enlarged side elevational view of a front portion of the bicycle showing one of the bicycle disc brake caliper assemblies including a bicycle disc brake caliper and a first mounting adapter.
Figure 3:
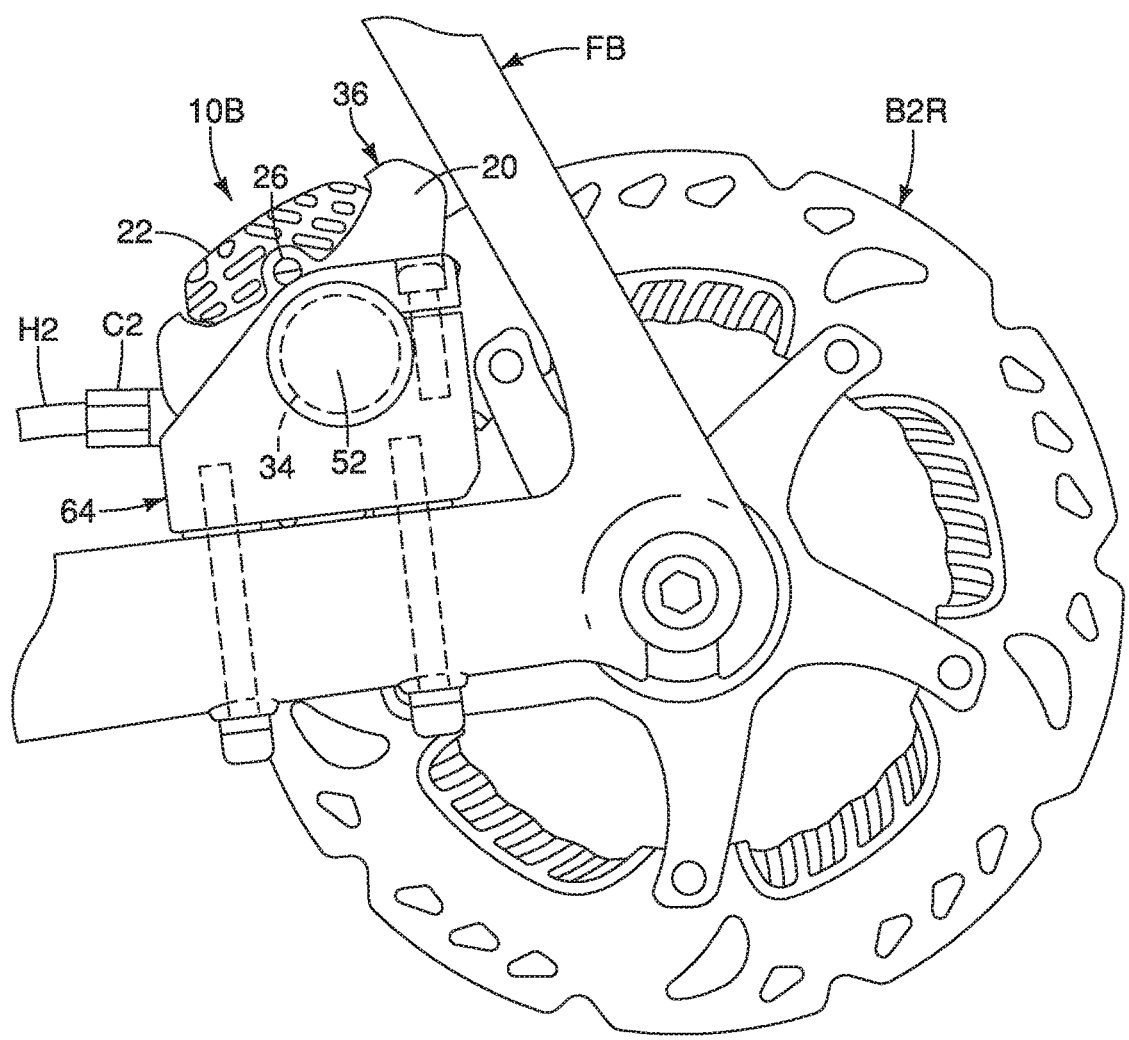
FIG. 3 is an enlarged side elevational view of a rear portion of the bicycle showing other of the bicycle disc brake caliper assemblies including a bicycle disc brake caliper and a second mounting adapter.

As seen in FIGS. 1 to 3, the bicycle disc brake caliper assembly 10A is mounted to the front fork FF of the bicycle frame F, while the bicycle disc brake caliper assembly 10B is mounted to the frame body FB (i.e., a chain stay) of the bicycle frame F. The bicycle disc brake caliper assembly 10A is configured to engage the front brake rotor BR1 in a conventional manner. The bicycle disc brake caliper assembly 10B is configured to engage the rear brake rotor BR2 in a conventional manner. Here, the bicycle disc brake caliper assemblies 10A and 10B are hydraulically operated. The bicycle disc brake caliper assembly 10A is fluidly connected to a brake operating device BD by a first hydraulic hose H1, while the bicycle disc brake caliper assembly 10B is fluidly connected to a brake operating device BD by a second hydraulic hose H2. However, the bicycle disc brake caliper assemblies 10A and 10B can be mechanically (cable) operated.

Figure 4:
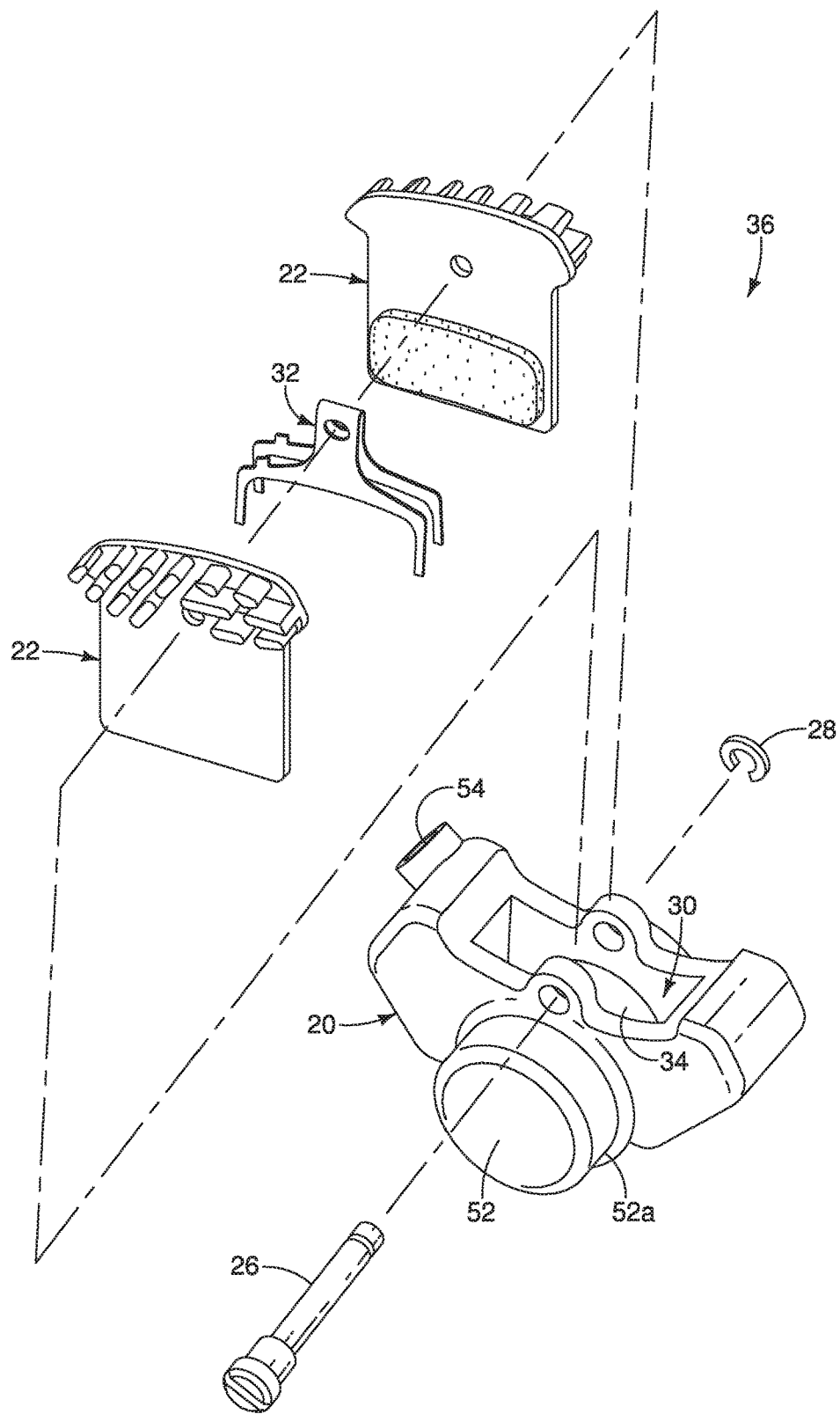
FIG. 4 is an exploded perspective view of the bicycle disc brake caliper of the bicycle disc brake caliper assembly.
Figure 5:
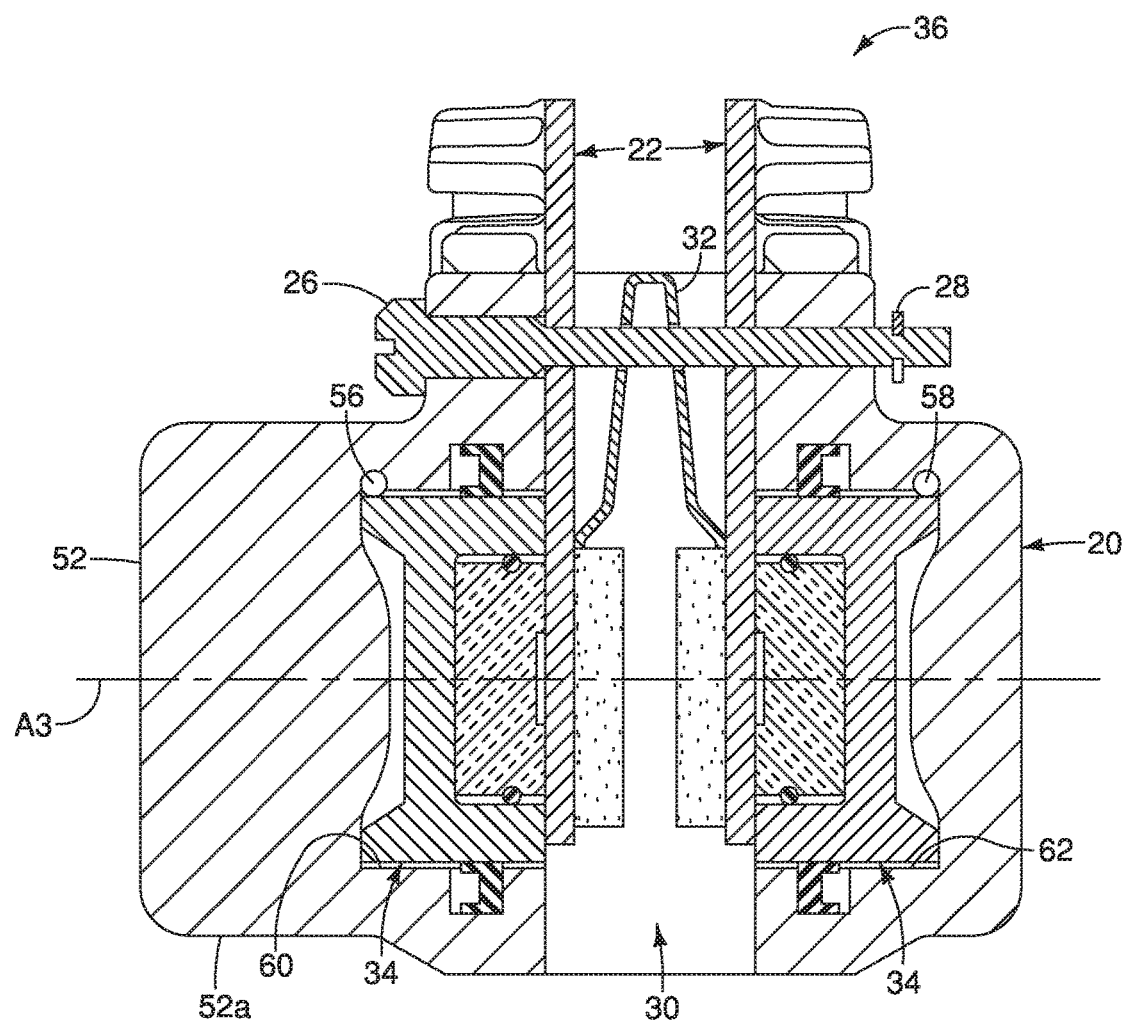
FIG. 5 is a cross sectional view of the bicycle disc brake caliper as seen along section line 5-5 of FIG. 2 with the first mounting adapter removed.

As seen in FIGS. 2, 4 and 5, the bicycle disc brake caliper assembly 10A basically comprises a main caliper body 20, at least one brake pad 22 and a mounting adapter 24. The at least one brake pad 22 is movably attached to the main caliper body 20. In the illustrated embodiment, the bicycle disc brake caliper assembly 10A includes a pair of the brake pads 22. The brake pads 22 are movably attached to the main caliper body 20 by a support pin 26 having a C-clip 28. The main caliper body 20 defines a brake rotor receiving slot 30 for receiving the front brake rotor BR1. The brake pads 22 are movably disposed in the brake rotor receiving slot 30 of the main caliper body 20. The brake pads 22 are maintained spaced apart by a biasing element 32 when the bicycle disc brake caliper assembly 10A is in a non-actuated position. The front brake rotor BR1 is disposed between the brake pads 22. Here, as seen in FIG. 5, the bicycle disc brake caliper assembly 10A further comprises a pair of pistons 34. However, the bicycle disc brake caliper assembly 10A can be configured to have only a single piston if needed and/or desired. The main caliper body 20, the brake pads 22, the support pin 26, the biasing element 32 and the pistons 34 form the basic parts of a bicycle disc brake caliper 36.

As seen in FIG. 3, the bicycle disc brake caliper assembly 10B basically comprises a bicycle disc brake caliper 36 and a mounting adapter 64. The bicycle disc brake caliper 36 of the bicycle disc brake caliper assembly 10B is identical to the bicycle disc brake caliper 36 of the bicycle disc brake caliper assembly 10A. Thus, the mounting adapters 24 and 64 are interchangeable between the bicycle disc brake calipers 36 of the bicycle disc brake caliper assemblies 10A and 10B. Since the bicycle disc brake calipers 36 are identical and the mounting adapters 24 and 64 are interchangeable between the bicycle disc brake caliper assemblies 10A and 10B, only the bicycle disc brake caliper assembly 10A will be discussed herein for the sake of brevity.

Referring to FIGS. 2, 4 and 5, the main caliper body 20 will now be discussed in further detail. In the illustrated embodiment, the main caliper body 20 is a one-piece member. Alternatively, the main caliper body 20 can be two or more pieces that are attached together by bolts, and adhesive or any other suitable fastening method. In the illustrated embodiment, the main caliper body 20 is made of aluminum alloy. Also, the material of the main caliper body 20 is not limited to aluminum alloy. The main caliper body 20 includes a first coupling portion 52 that is configured not to be directly attached to the bicycle frame F. In other words, the main caliper body 20 is configured such the main caliper body 20 cannot be directly attached to the bicycle frame F without a mounting adapter such as the mounting adapter 24. Stated different, the main caliper body 20 does not have any built-in structure that can be attached to a bicycle frame (such as the bicycle frame F) using merely conventional threaded fasteners.

The main caliper body 20 further includes a hydraulic fluid inlet port 54 that is attached to the first hydraulic hose H1 using a conventional hydraulic hose connector C1 that is provided on the end of the first hydraulic hose H1. For example, the hydraulic hose connector C1 of the first hydraulic hose H1 can be a threaded hose fitting as shown in FIG. 2. Alternatively, the main caliper body 20 can be configured to have a hydraulic fluid inlet port that is configured to receive a banjo bolt for fluidly connecting a hydraulic hose to the main caliper body 20. As seen in FIG. 5, the main caliper body 20 includes a hydraulic cylinder 60 in which one of the pistons 34 is movably disposed. More preferably, the main caliper body 20 includes another hydraulic cylinder 62 in which the other one of the pistons 34 is movably disposed. While the bicycle disc brake caliper 36 includes a pair of movable pistons 34, it will be apparent to those skilled in the bicycle field from this disclosure that the bicycle disc brake caliper 36 can have one non-movable piston and only one movable piston if needed and/or desired. Here, the hydraulic cylinder 60 is fluidly connected to the hydraulic fluid inlet port 54 via an internal fluid passage 56, while the hydraulic cylinder 62 is fluidly connected to the hydraulic fluid inlet port 54 via an internal fluid passage 58. The pistons 34 are biased away from each other by the biasing element 32, which presses the brake pads 22 outwardly against the pistons 34. The pistons 34 are moved together due to the pressure of the hydraulic fluid acting on the pistons 34 as a result of a user squeezing a brake lever of the brake operating device. Preferably, although not shown, the main caliper body 20 further includes a fluid outlet port for receiving a bleed valve.

Figure 6:
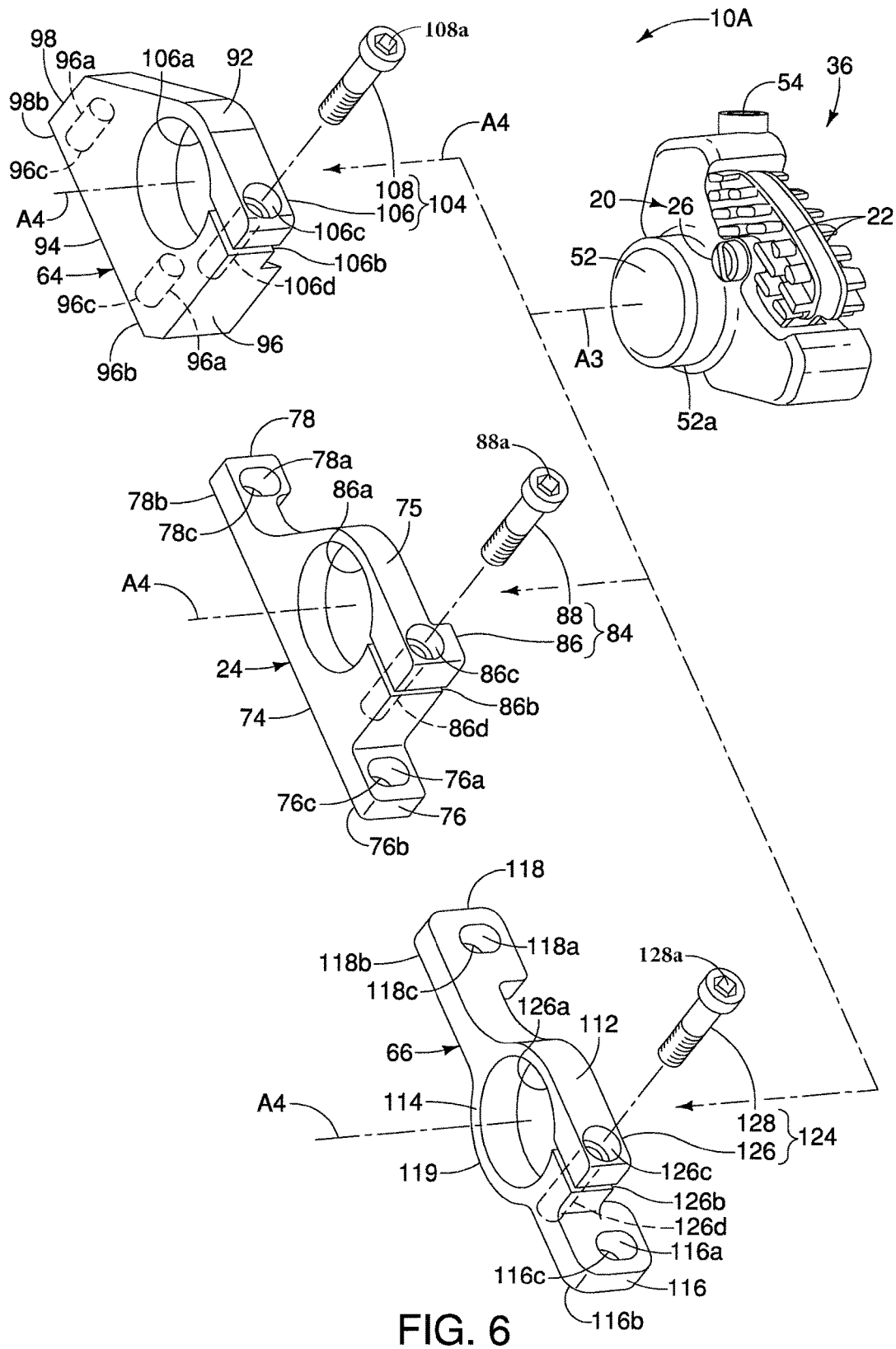
FIG. 6 is a perspective view of the bicycle disc brake caliper assembly showing the bicycle disc brake caliper and the first, second and third mounting adapters.
Figure 7:
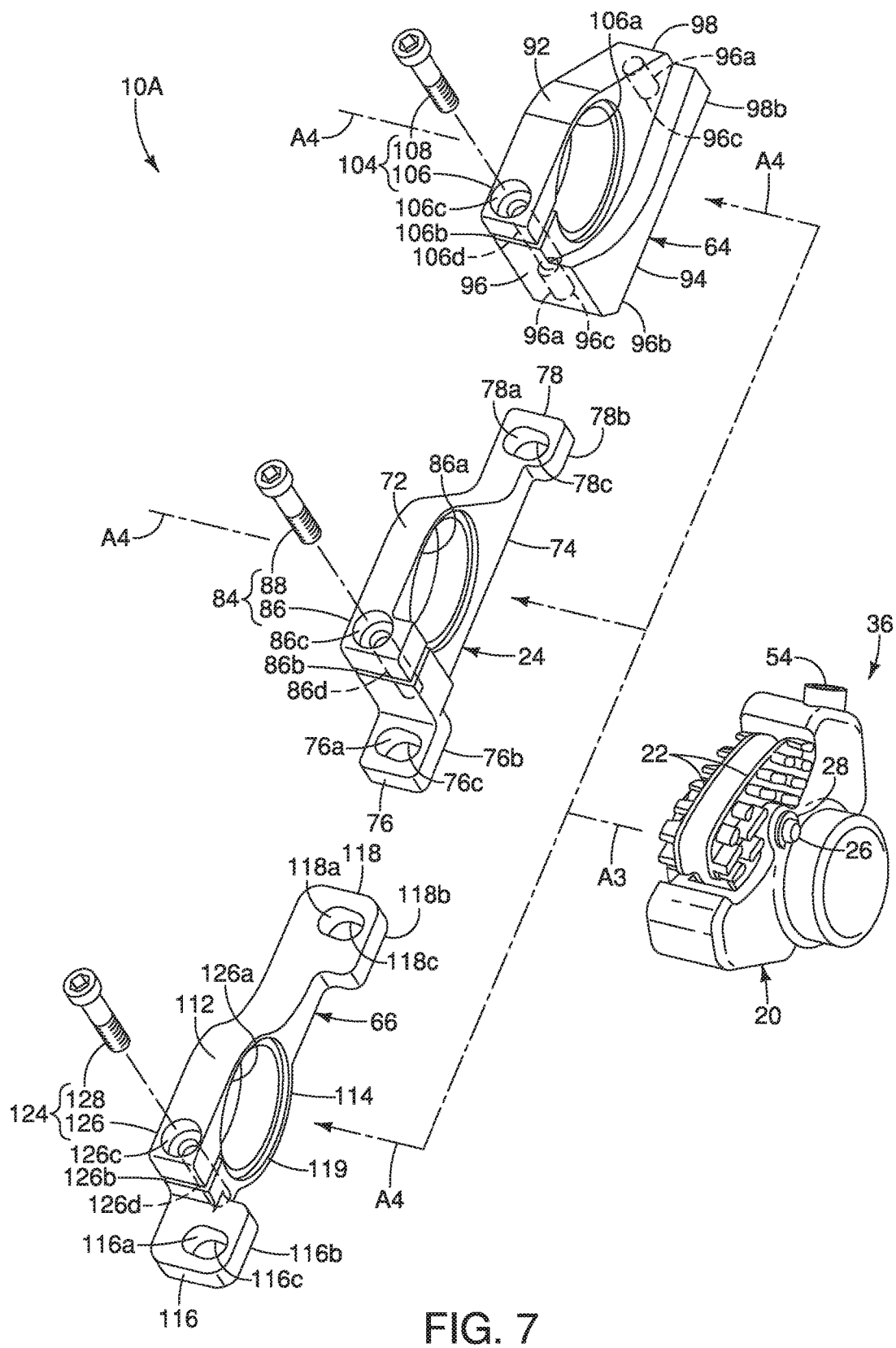
FIG. 7 is a perspective view of the bicycle disc brake caliper assembly showing the bicycle disc brake caliper and the first, second and third mounting adapters.

Referring to FIGS. 6 and 7, the bicycle disc brake caliper assembly 10A further comprises an additional mounting adapter 64 that is interchangeable with the mounting adapter 24. More preferably, the bicycle disc brake caliper assembly 10A further comprises an additional mounting adapter 66 that is interchangeable with the mounting adapters 24 and 64. In other words, the bicycle disc brake caliper 36 can be mounted to a variety of different frames by selectively using one of the mounting adapters 24, 64 and 66. More specially, the main caliper body 20 is configured to be detachably attached, one at a time, to each of the mounting adapters 24, 64 and 66 so that the bicycle disc brake caliper assembly 10A can be mounted to different frames. Thus, one of the mounting adapters 24, 64 and 66 constitutes a first mounting adapter, another one of the mounting adapters 24, 64 and 66 constitutes a second mounting adapter, and another one of the mounting adapters 24, 64 and 66 constitutes a third mounting adapter.

As a result of this configuration of the bicycle disc brake caliper 36 and the mounting adapters 24, 64 and 66, the bicycle disc brake caliper assembly 10A can be sold as a kit that includes the bicycle disc brake caliper 36 and either two of the mounting adapters 24, 64 and 66, or all three of the mounting adapters 24, 64 and 66. Alternatively, the bicycle disc brake caliper 36 and the mounting adapters 24, 64 and 66 can be sold separately, or the bicycle disc brake caliper 36 and one of the mounting adapters 24, 64 and 66 can be sold together.

Figure 8:
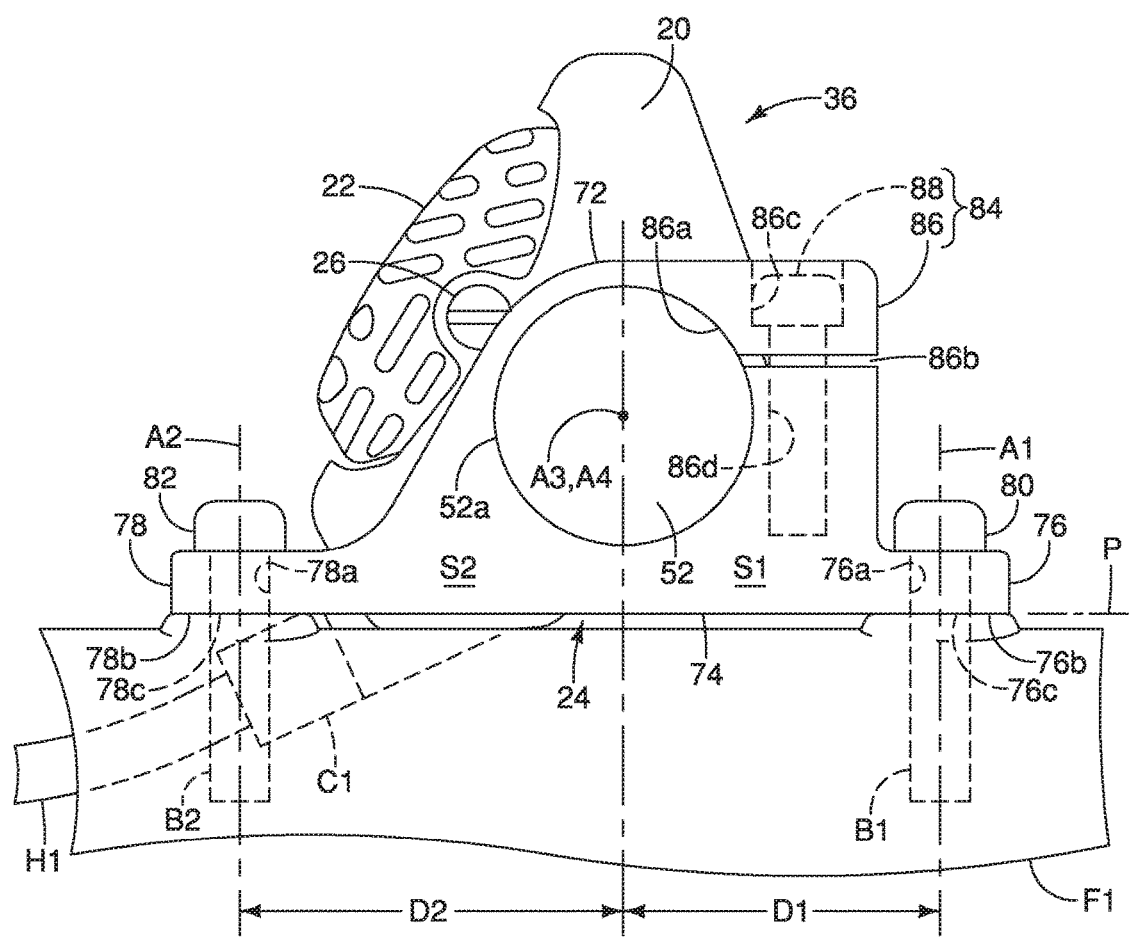
FIG. 8 is an enlarged side elevational view of the bicycle disc brake caliper assembly illustrated in FIGS. 1 and 2 with the bicycle disc brake caliper in a first position with respect to the first mounting adapter.
Figure 9:
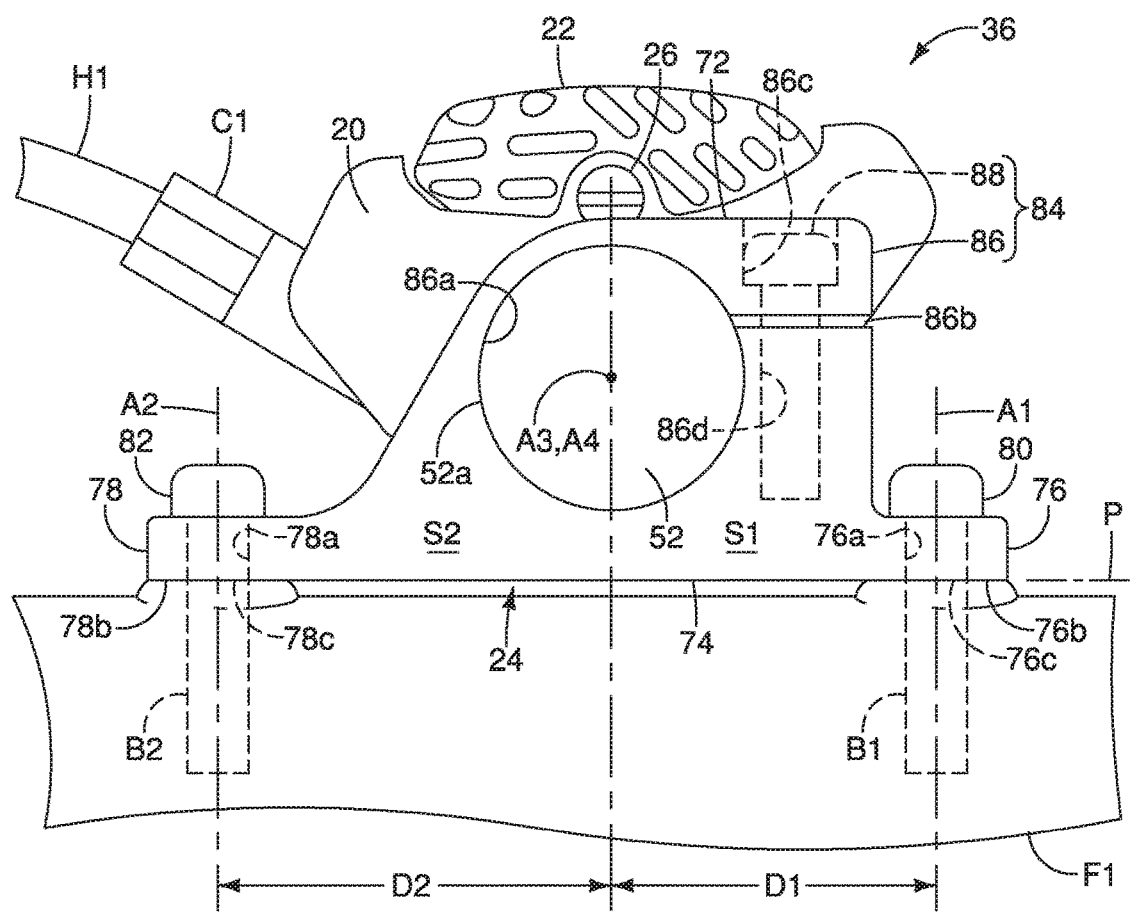
FIG. 9 is an enlarged side elevational view, similar to FIG. 8, of the bicycle disc brake caliper assembly but with the bicycle disc brake caliper in a second position with respect to the first mounting adapter.
Figure 10:
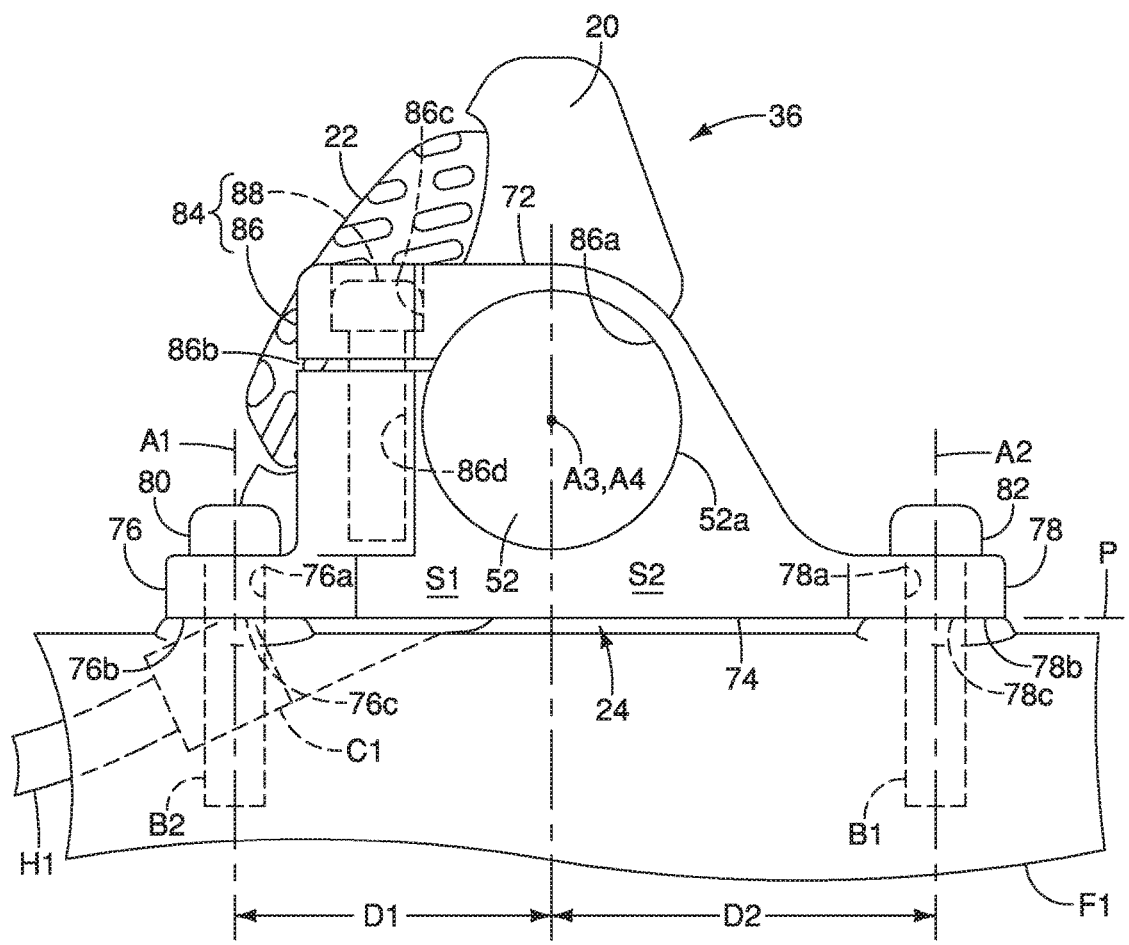
FIG. 10 is an enlarged side elevational view, similar to FIGS. 8 and 9, of the bicycle disc brake caliper assembly but with the first mounting adapter flipped with respect to the bicycle disc brake caliper.

Referring to FIGS. 6 to 10, in the illustrated embodiment, the mounting adapter 24 will be discussed in further detail with respect to a bicycle frame F1. The portion of the bicycle frame F1 that is illustrated in FIGS. 8 to 10 can be a front fork, a chain stay or any other suitable portion of a bicycle frame for mounting the bicycle disc brake caliper. The mounting adapter 24 basically includes a second coupling portion 72 and a mounting portion 74. The second coupling portion 72 is configured to be detachably coupled to the first coupling portion 52. The mounting portion 74 is configured to be detachably mounted to the bicycle frame F1 (e.g., the front fork FF of the bicycle frame F in FIG. 2). The mounting portion 74 includes a first mounting part 76 and a second mounting part 78. Here, in the first and second mounting parts 76 and 78 are flanges that extend outwardly from the second coupling portion 72. In other words, the first mounting part 76 constitutes a first mounting flange, while the second mounting part 78 constitutes a second mounting flange. As seen in FIG. 8, the first mounting part 76 includes a first mounting bore 76a defining a first mounting axis A1. The second mounting part 78 includes a second mounting bore 78a defining a second mounting axis A2. Preferably, as in the illustrated embodiment, the first mounting axis A1 is parallel to the second mounting axis A2. However, it will be apparent to those skilled in the bicycle field from this disclosure that the first mounting axis A1 can be non-parallel to the second mounting axis A2, if needed. Here, the first and second mounting bores are through holes having no threaded portion. Further, the first and second mounting bores 76a and 78a are elongated bores that are elongated in directions parallel to a movement axis A3 of the pistons 34. The first and second mounting axes A1 and A2 correspond to center axes of the first and second mounting bores 76a and 78a, respectively. Typically, the first and second mounting axes A1 and A2 of the first and second mounting bores 76a and 78a are spaced sixty-eight millimeters apart or seventy-four millimeters apart. The movement axis A3 is perpendicular to the first and second mounting axes A1 and A2 as seen in a direction perpendicular to both the movement axis A3 and the first and second mounting axes A1 and A2. The pistons 34 are movably disposed in the hydraulic cylinders 60 and 62 along the movement axis A3 that is non-parallel to the first and second mounting axes A1 and A2.

Alternatively, the first and second mounting parts 76 and 78 can be flanges that have first and second mounting bores, respectively, that have mounting axes parallel to the movement axis A3 of the pistons 34. In such a configuration, the bicycle frame (e.g., front fork or rear chain stay) has a pair of threaded mounting bores with axis extending perpendicular to a vertical longitudinal center plane of the bicycle. Typically, the centers of the mounting bores are spaced fifty-one millimeters apart.

The first mounting part 76 includes a first bicycle mounting surface 76b that has a first opening 76c of the first mounting bore 76a. The second mounting part 78 includes a second bicycle mounting surface 78b that has a second opening 78c of the second mounting bore 78a. The first mounting part 76 is detachably attached to the bicycle frame F1 by a first fastener 80, while the second mounting part 78 is detachably attached to the bicycle frame F by a second fastener 82. Here, the first and second fasteners 80 and 82 are threaded fasteners (e.g., fixing bolts). The first and second mounting parts 76 and 78 are clamped between head portions of the fasteners 80 and 82 and the bicycle frame F1, respectively, upon screwing the fasteners 80 and 82 into threaded bores B1 and B2 of the bicycle frame F1. However, it will be apparent to those skilled in the bicycle field from this disclosure that the first and second fasteners 80 and 82 can be other types of fasteners such as a nut that receives a threaded stud or bolt of the bicycle frame F1.

In the illustrated embodiment, preferably, the first and second bicycle mounting surfaces 76b and 78b lie in a mounting plane P. However, it will be apparent to those skilled in the bicycle field from this disclosure that the first and second bicycle mounting surfaces 76b and 78b can be offset mounting planes, if needed. No portion of the mounting adapter 24 between the first opening 76c and the second opening 78c extends beyond the mounting plane P in a direction toward the bicycle frame F1. This configuration of the mounting portion 74 allows the mounting adapter 24 to be mounted close to the bicycle frame F1.

In the illustrated embodiment, the first mounting part 76 is disposed on a first side S1 of the second coupling portion 72. The second mounting part 78 is disposed on a second side S2 of the second coupling portion 72. The second side S2 is opposite to the first side S1 with respect to the second coupling portion 72.

As seen in FIGS. 8 to 10, the bicycle disc brake caliper 36 is adjustably mounted to the mounting adapter 24 for changing at least one of an orientation and a location of the bicycle disc brake caliper 36 with respect to the bicycle frame F1. To adjust the orientation of the bicycle disc brake caliper 36 with respect to the bicycle frame F1, the first coupling portion 52 of the main caliper body 20 includes one of a clamp and a projection, while the second coupling portion 72 of the mounting adapter 24 includes other of the clamp and the projection. In the illustrated embodiment, the first coupling portion 52 of the main caliper body 20 includes a projection 52a, and the mounting adapter 24 includes a clamp 84. However, it will be apparent to those skilled in the bicycle field from this disclosure that the main caliper body 20 includes one of a clamp and a projection, while the second coupling portion 72 of the mounting adapter 24 includes the other of the clamp and the projection.

The clamp 84 has a clamping portion 86 and a clamping fastener 88 having a tool engagement portion 88a. The clamping portion 86 defines a projection receiving opening 86a. The projection receiving opening 86a has the projection 52a clamped therein. The clamping fastener 88 is operatively coupled to the clamping portion 86 to adjust a size of the projection receiving opening 86a. In particular, the clamping portion 86 has a slit 86b that extends from the projection receiving opening 86a so that the clamping portion 86 can be resiliently flexed to adjust a size of the projection receiving opening 86a by tightening and loosening the clamping fastener 88. Thus, the clamp 84 is a non-hinged split clamp. Here, the clamping fastener 88 is a threaded fastener (i.e., a fixing bolt). The clamping fastener 88 extends through a first bore 86c of the clamping portion 86, and is threaded into a second (threaded) bore 86d of the clamping portion 86 (the second bore 86d can be alternatively called a fastening bore for receiving the clamping fastener 88). The clamping fastener 88 extends across the slit 86b. However, it will be apparent to those skilled in the bicycle field from this disclosure that the clamping portion 86 can be provided with a hinge if needed and/or desired. Alternatively, it will be apparent to those skilled in the bicycle field from this disclosure that the clamping portion 86 can be provided with two clamping parts that are connected by a pair of fixing bolts, if needed and/or desired.

The projection receiving opening 86a defines a pivot axis A4. To adjust the orientation of the bicycle disc brake caliper 36 with respect to the bicycle frame F1, the bicycle disc brake caliper 36 can be pivoted relative to the mounting adapter 24 about the pivot axis A4 as seen in FIGS. 8 and 9. Specifically, if the bicycle disc brake caliper 36 is fixed relative to the mounting adapter 24, then the clamping fastener 88 is loosened to allow the bicycle disc brake caliper 36 to pivot relative to the mounting adapter 24 about the pivot axis A4. Next, a desired mounting position can be obtained by holding the bicycle disc brake caliper 36 in the desired orientation and then screwing in the clamping fastener 88 to tighten the clamping portion 86 around the projection 52a. Here, the projection receiving opening 86a is a circular opening and the projection 52a has a cylindrical exterior surface that mates with the projection receiving opening 86a. In other words, the mounting adapter 24 adjustably supports the main caliper body 20 about the pivot axis A4 between at least two different mounting positions as seen in FIGS. 8 and 9. Alternatively, it will be apparent to those skilled in the bicycle field from this disclosure that the projection receiving opening 86a and the projection 52a can have non-circular mating shapes that provide a predetermined number of the different mounting positions. Further, the projection receiving opening 86a and the projection 52a can be circular shapes having corresponding serrations that provide a predetermined number of the different mounting positions. According to these constructions, the mounting positions of the main caliper body 20 are easily kept around the pivot axis A4 with respect to the mounting adapter 24.

To adjust the location of the bicycle disc brake caliper 36 with respect to the bicycle frame F1, the mounting adapter 24 is flipped one hundred and eighty degrees about the mounting plane P from the mounting position shown in FIG. 8 to the mounting position shown in FIG. 10. Specifically, the first mounting axis A1 is spaced by a first distance D1 from the second coupling portion 72 as measured along a minimum straight line connecting the first and second mounting axes A1 and A2. On the other hand, the second mounting axis A2 is spaced by a second distance D2 from the second coupling portion 72 as measured along the minimum straight line. In other words, the first and second distances D1 and D2 are measured from a center portion of the second coupling portion 72 to the first and second mounting axes A1 and A2, respectively. The second distance D2 is greater than the first distance D1. With this configuration, location of the bicycle disc brake caliper 36 can be adjusted with respect to the bicycle frame F1 so that the bicycle disc brake caliper 36 can be used with two different sizes of brake rotors, e.g. one hundred and forty millimeters and one hundred and sixty millimeters.

Figure 11:
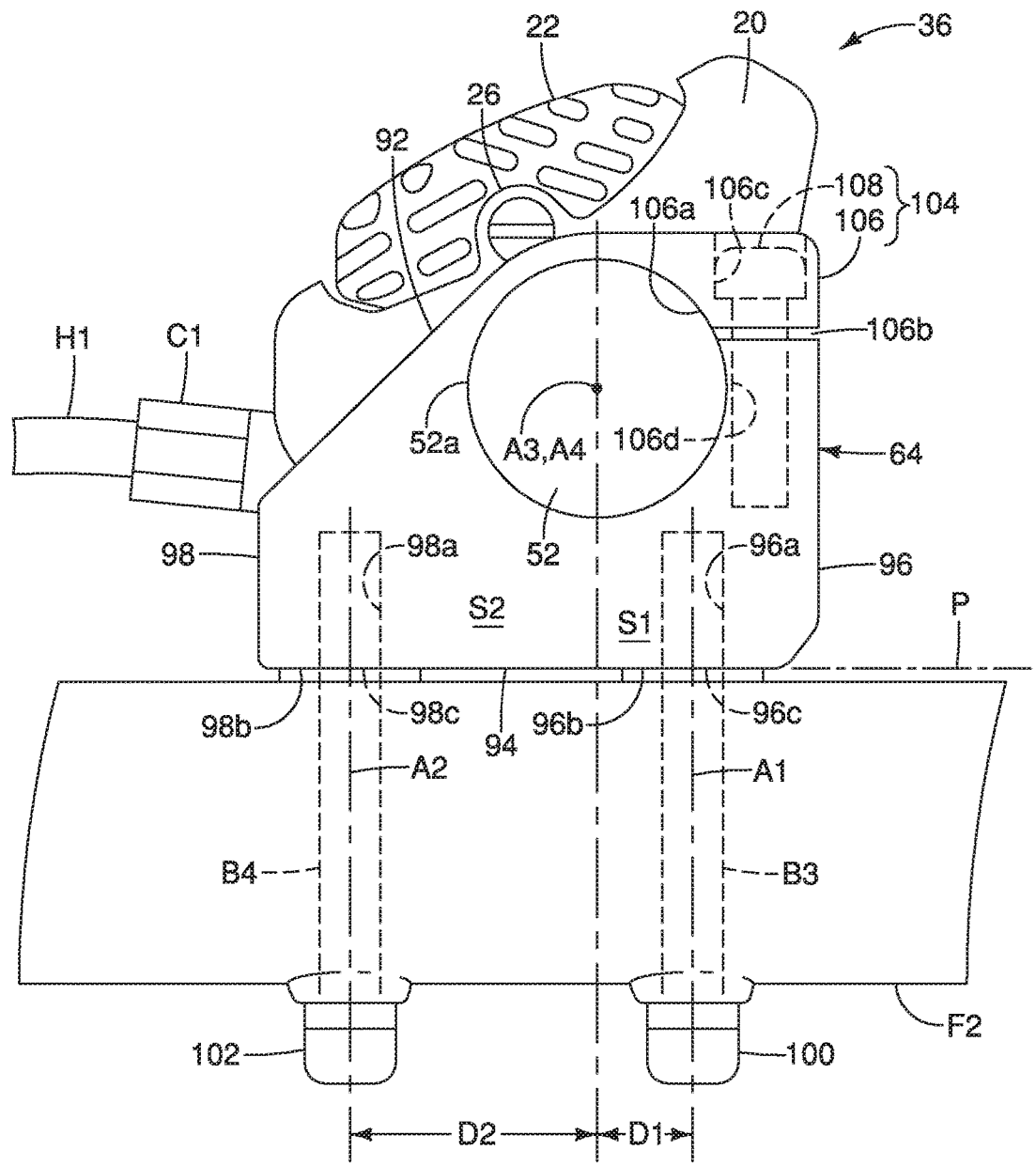
FIG. 11 is an enlarged side elevational view of the bicycle disc brake caliper assembly illustrated in FIGS. 1 and 2 with the bicycle disc brake caliper in a first position with respect to the second mounting adapter.
Figure 12:
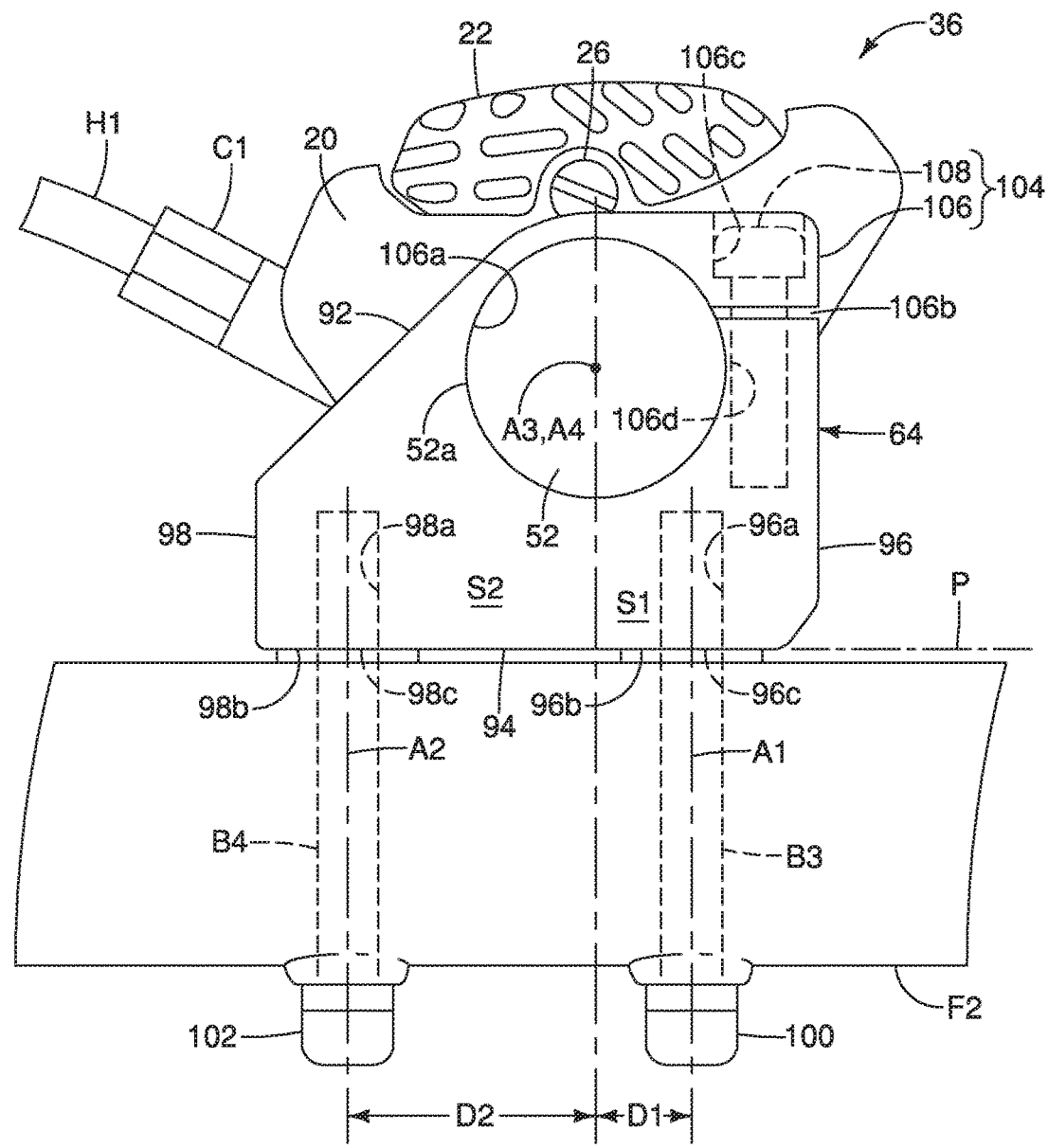
FIG. 12 is an enlarged side elevational view, similar to FIG. 11, of the bicycle disc brake caliper assembly but with the bicycle disc brake caliper in a second position with respect to the second mounting adapter.
Figure 13:
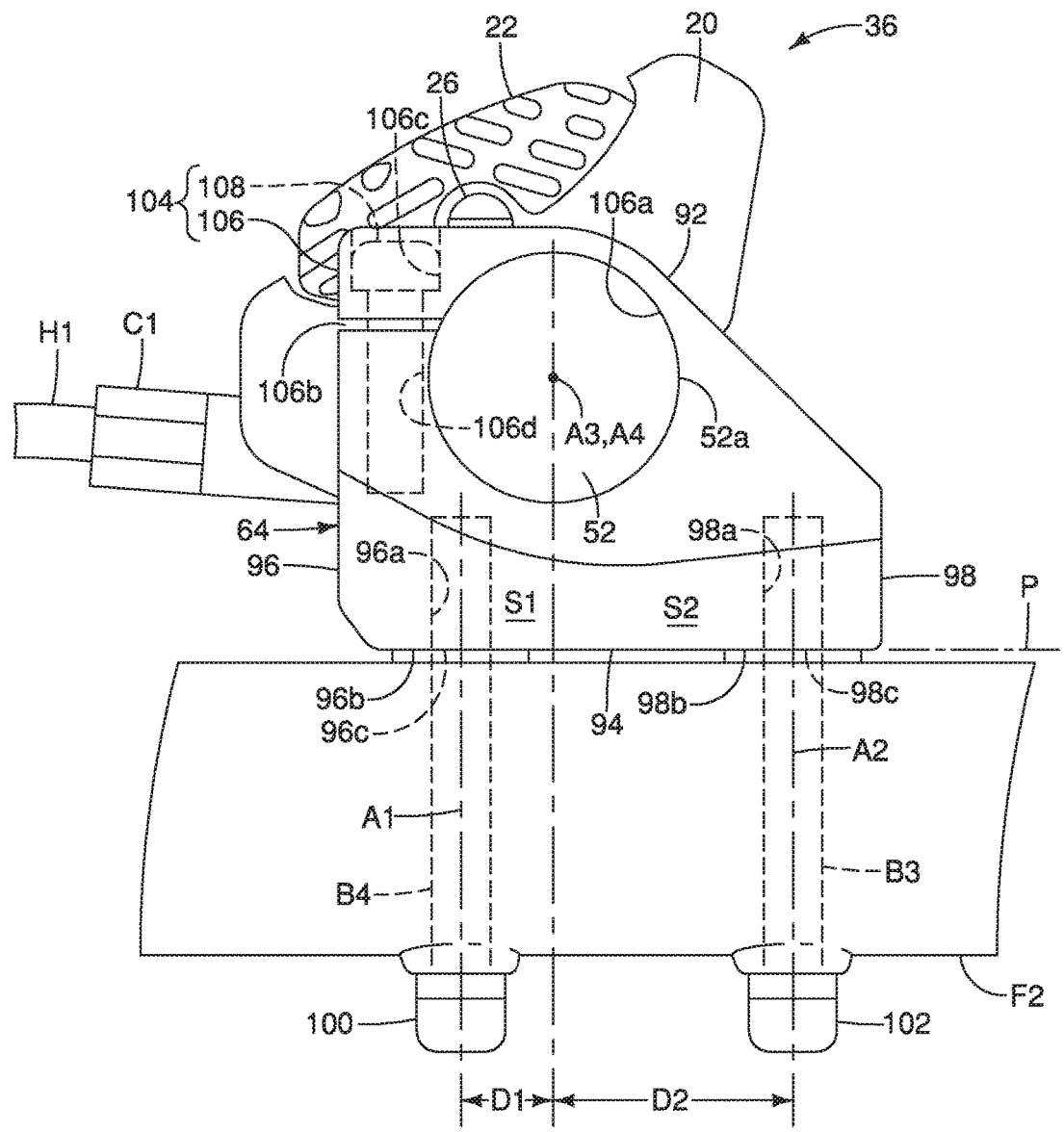
FIG. 13 is an enlarged side elevational view, similar to FIGS. 11 and 12, of the bicycle disc brake caliper assembly but with the second mounting adapter flipped with respect to the bicycle disc brake caliper.

Referring to FIGS. 6, 7 and 11 to 13, in the illustrated embodiment, the additional mounting adapter 64 will be discussed in further detail with respect to a different bicycle frame F2 that is different from the bicycle frame F1. The portion of the bicycle frame F2 that is illustrated in FIGS. 11 to 13 can be a front fork, a chain stay or any other suitable portion of a bicycle frame for mounting the bicycle disc brake caliper. The additional mounting adapter 64 basically includes a second coupling portion 92 and a mounting portion 94. The second coupling portion 92 is configured to be detachably coupled to the first coupling portion 52. As seen in FIGS. 11 to 13, the additional mounting adapter 64 has a different mounting portion 94 with respect to the mounting portion 74 of the mounting adapter 24. The different mounting portion 94 is configured to be mounted to the different bicycle frame F2 with respect to the bicycle frame F used with the mounting adapter 24. The mounting portion 94 is configured to be detachably mounted to the bicycle frame F2. The mounting portion 94 includes a first mounting part 96 and a second mounting part 98. Here, the first mounting part 96 includes a first mounting bore 96a defining a first mounting axis A1. The second mounting part 98 includes a second mounting bore 98a defining a second mounting axis A2. Here, the first mounting axis A1 is parallel to the second mounting axis A2. The first and second mounting axes A1 and A2 correspond to a center axis of the first and second mounting bores 96a and 98a. The movement axis A3 is perpendicular to the first and second mounting axes A1 and A2 as seen in a direction perpendicular to both the movement axis A3 and the first and second mounting axes A1 and A2.

The first mounting part 96 includes a first bicycle mounting surface 96b that has a first opening 96c of the first mounting bore 96a. The second mounting part 98 includes a second bicycle mounting surface 98b that has a second opening 98c of the second mounting bore 98a. In the illustrated embodiment, preferably, the first and second bicycle mounting surfaces 96b and 98b lie in a mounting plane P. No portion of the mounting adapter 24 between the first opening 96c and the second opening 98c extends beyond the mounting plane P in a direction toward the bicycle frame F2. This configuration of the mounting portion 94 allows the mounting adapter 64 to be mounted close to the bicycle frame F2.

As seen in FIGS. 11 to 13, the first mounting bore 96a has a first internal thread engaged with a first external thread of a first fastener 100. The second mounting bore 98a has a second internal thread engaged with a second external thread of a second fastener 102. The bicycle frame F2 is clamped between the first and second mounting parts 96 and 98 and head portions of the fasteners 100 and 102 respectively, upon screwing the fasteners 100 and 102 into the first and second mounting bores 96a and 98a, respectively. In this way, the first mounting part 96 is detachably attached to the bicycle frame F2 by the first fastener 100, while the second mounting part 98 is detachably attached to the bicycle frame F2 by the second fastener 102. Here, the first and second fasteners 100 and 102 are threaded fasteners (e.g., fixing bolts). With this configuration, the mounting adapter 64 is particular useful for mounting a bicycle disc brake caliper to a bicycle frame having a pair of unthreaded through bores B3 and B4 for attaching a bicycle disc brake caliper to the bicycle frame.

In the illustrated embodiment, the first mounting part 96 is disposed on a first side S1 of the second coupling portion 92. The second mounting part 98 is disposed on a second side S2 of the second coupling portion 92. The second side S2 is opposite to the first side S1 with respect to the second coupling portion 92.

As seen in FIGS. 11 to 13, the bicycle disc brake caliper 36 is adjustably mounted to the mounting adapter 64 for changing at least one of an orientation and a location of the bicycle disc brake caliper 36 with respect to the bicycle frame F2. Basically, the adjustment of the bicycle disc brake caliper 36 using the mounting adapter 64 is accomplished in the same manner as with the mounting adapter 24, as discussed above.

To adjust the orientation of the bicycle disc brake caliper 36 with respect to the bicycle frame F2, the mounting adapter 64 includes a clamp 104 that has a clamping portion 106 and a clamping fastener 108 having a tool engagement portion 108a. The clamping portion 106 defines a projection receiving opening 106a. The projection receiving opening 106a has the projection 52a clamped therein. The clamping fastener 108 is operatively coupled to the clamping portion 106 to adjust a size of the projection receiving opening 106a. In particular, the clamping portion 106 has a slit 106b that extends from the projection receiving opening 106a so that the clamping portion 106 can be resiliently flexed to adjust a size of the projection receiving opening 106a by tightening and loosening the clamping fastener 108. Thus, the clamp 84 is a non-hinged split clamp. Here, the clamping fastener 108 is a threaded fastener (i.e., a fixing bolt). The clamping fastener 108 extends through a first bore 106c of the clamping portion 106, and is threaded into a second (threaded) bore 106d of the clamping portion 106 (the second bore 106d can be alternatively called a fastening bore for receiving the clamping fastener 108). The clamping fastener 108 extends across the slit 106b.

The projection receiving opening 106a defines a pivot axis A4. To adjust the orientation of the bicycle disc brake caliper 36 with respect to the bicycle frame F2, the bicycle disc brake caliper 36 can be pivoted relative to the mounting adapter 64 about the pivot axis A4 as seen in FIGS. 11 and 12. Specifically, if the bicycle disc brake caliper 36 is fixed relative to the mounting adapter 64, then the clamping fastener 108 is loosened to allow the bicycle disc brake caliper 36 to pivot relative to the mounting adapter 64 about the pivot axis A4. Next, a desired mounting position can be obtained by holding the bicycle disc brake caliper 36 in the desired orientation and then screwing in the clamping fastener 108 to tighten the clamping portion 106 around the projection 52a.

To adjust the location of the bicycle disc brake caliper 36 with respect to the bicycle frame F2, the mounting adapter 64 is flipped one hundred and eighty degrees about the mounting plane P from the mounting position shown in FIG. 11 to the mounting position shown in FIG. 13. Specifically, the first mounting axis A1 is spaced by a first distance D1 from the second coupling portion 92 as measured along a minimum straight line connecting the first and second mounting axes A1 and A2. On the other hand, the second mounting axis A2 is spaced by a second distance D2 from the second coupling portion 92 as measured along the minimum straight line. In other words, the first and second distances D1 and D2 are measured from a center portion of the second coupling portion 92 to the first and second mounting axes A1 and A2, respectively. The second distance D2 is greater than the first distance D1. With this configuration, location of the bicycle disc brake caliper 36 can be adjusted with respect to the bicycle frame F2 so that the bicycle disc brake caliper 36 can be used with two different sizes of brake rotors.

Figure 14:
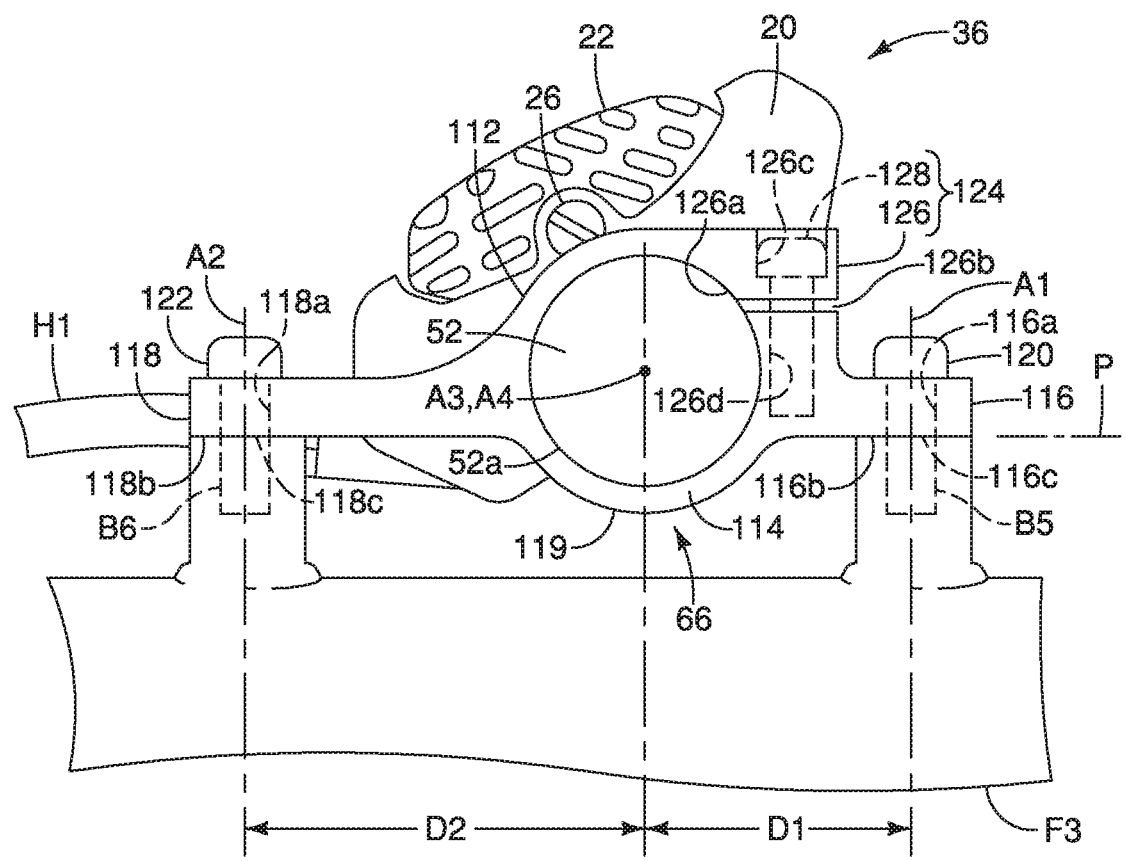
FIG. 14 is an enlarged side elevational view of the bicycle disc brake caliper assembly with the bicycle disc brake caliper illustrated in FIGS. 1 and 2 in a first position with respect to a third mounting adapter.
Figure 15:
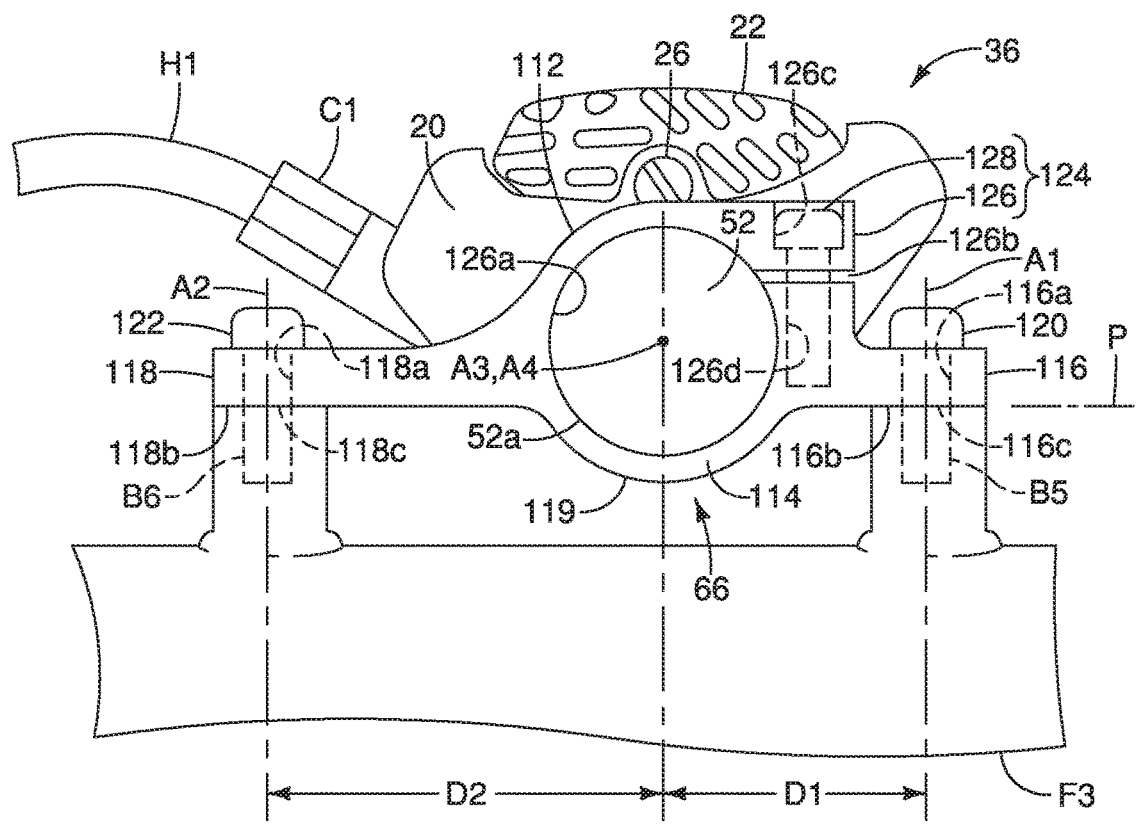
FIG. 15 is an enlarged side elevational view, similar to FIG. 14, of the bicycle disc brake caliper assembly but with the bicycle disc brake caliper in a second position with respect to the third mounting adapter.
Figure 16:
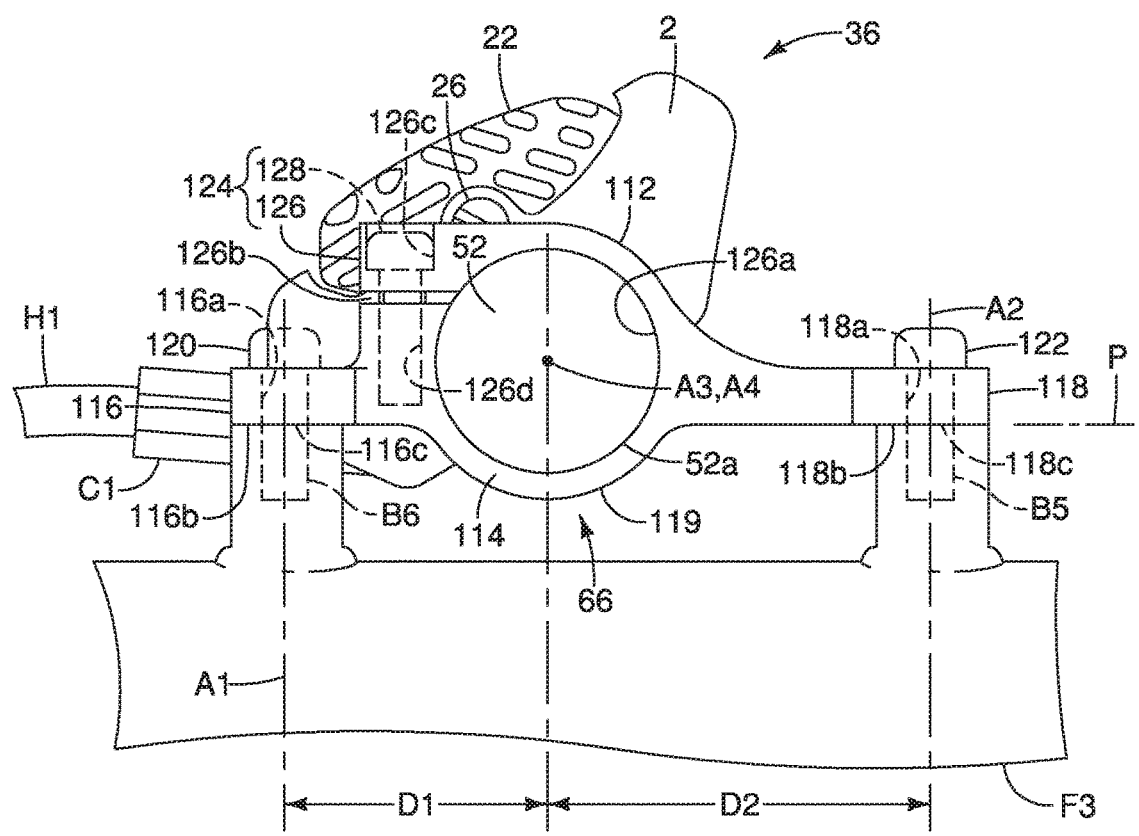
FIG. 16 is an enlarged side elevational view, similar to FIGS. 14 and 15, of the bicycle disc brake caliper assembly but with the third mounting adapter flipped with respect to the bicycle disc brake caliper.

Referring to FIGS. 6, 7 and 14 to 16, in the illustrated embodiment, the additional mounting adapter 66 will be discussed in further detail will be discussed in further detail with respect to a bicycle frame F3 that is different from the bicycle frames F1 and F2. The portion of the bicycle frame F3 that is illustrated in FIGS. 14 to 16 can be a front fork, a chain stay or any other suitable portion of a bicycle frame for mounting the bicycle disc brake caliper. The additional mounting adapter 66 basically includes a second coupling portion 112 and a mounting portion 114. The second coupling portion 112 is configured to be detachably coupled to the first coupling portion 52. As seen in FIGS. 14 to 16, the additional mounting adapter 66 has a different mounting portion 114 with respect to the mounting portion 74 of the mounting adapter 24. The different mounting portion 114 is configured to be mounted to a different bicycle frame F3 with respect to the bicycle frame F used with the mounting adapter 24. The mounting portion 114 is configured to be detachably mounted to the bicycle frame F3. The mounting portion 114 includes a first mounting part 116 and a second mounting part 118. Here, the first mounting part 116 includes a first mounting bore 116a defining a first mounting axis A1. The second mounting part 118 includes a second mounting bore 118a defining a second mounting axis A2. Preferably, as in the illustrated embodiment, the first mounting axis A1 is parallel to the second mounting axis A2. The first and second mounting axes A1 and A2 correspond to a center axis of the first and second mounting bores 116a and 118a. The movement axis A3 is perpendicular to the first and second mounting axes A1 and A2 as seen in a direction perpendicular to both the movement axis A3 and the first and second mounting axes A1 and A2.

The first mounting part 116 includes a first bicycle mounting surface 116b that has a first opening 116c of the first mounting bore 116a. The second mounting part 118 includes a second bicycle mounting surface 118b that has a second opening 118c of the second mounting bore 118a. In the illustrated embodiment, preferably, the first and second bicycle mounting surfaces 116b and 118b lie in a mounting plane P. The mounting adapter 66 has a protruding part 119 between the first opening 116c and the second opening 118c extending beyond the mounting plane P in a direction toward the bicycle frame F3. The protruding part 119 is formed by a section of the mounting portion 114 of the mounting adapter 66. With this configuration, the bicycle disc brake caliper 36 can be mounted to posts of the bicycle frame F3 and have a low profile. In other words, the mounting adapter 66 is particular useful for mounting a bicycle disc brake caliper to a bicycle frame having a pair of mounting posts for supporting a bicycle disc brake caliper.

As seen in FIGS. 14 to 16, the first mounting part 116 is detachably attached to the bicycle frame F3 by a first fastener 120, while the second mounting part 118 is detachably attached to the bicycle frame F3 by a second fastener 122. Here, the first and second fasteners 120 and 122 are threaded fasteners (e.g., fixing bolts). The first and second mounting parts 116 and 118 are clamped between head portions of the fasteners 120 and 122 and the bicycle frame F3, respectively, upon screwing the fasteners 120 and 122 into threaded bores B5 and B6 of the bicycle frame F3. In this way, the first mounting part 116 is detachably attached to the bicycle frame F3 by the first fastener 120, while the second mounting part 118 is detachably attached to the bicycle frame F3 by the second fastener 122. However, it will be apparent to those skilled in the bicycle field from this disclosure that the first and second fasteners 120 and 122 can be other types of fasteners such as a nut that receives a threaded stud or bolt of the bicycle frame F3.

In the illustrated embodiment, the first mounting part 116 is disposed on a first side S1 of the second coupling portion 112. The second mounting part 118 is disposed on a second side S2 of the second coupling portion 112. The second side S2 is opposite to the first side S1 with respect to the second coupling portion 112.

As seen in FIGS. 14 to 16, the bicycle disc brake caliper 36 is adjustably mounted to the mounting adapter 66 for changing at least one of an orientation and a location of the bicycle disc brake caliper 36 with respect to the bicycle frame F3. Basically, the adjustment of the bicycle disc brake caliper 36 using the mounting adapter 66 is accomplished in the same manner as with the mounting adapter 24, as discussed above.

To adjust the orientation of the bicycle disc brake caliper 36 with respect to the bicycle frame F3, the mounting adapter 66 includes a clamp 124 that has a clamping portion 126 and a clamping fastener 128 having a tool engagement portion 128a. The clamping portion 126 defines a projection receiving opening 126a. The projection receiving opening 126a has the projection 52a clamped therein. The clamping fastener 128 is operatively coupled to the clamping portion 126 to adjust a size of the projection receiving opening 126a. In particular, the clamping portion 126 has a slit 126b that extends from the projection receiving opening 126a so that the clamping portion 126 can be resiliently flexed to adjust a size of the projection receiving opening 126a by tightening and loosening the clamping fastener 128. Thus, the clamp 84 is a non-hinged split clamp. Here, the clamping fastener 128 is a threaded fastener (i.e., a fixing bolt). The clamping fastener 128 extends through a first bore 126c of the clamping portion 126, and is threaded into a second (threaded) bore 126d of the clamping portion 126 (the second bore 126d can be alternatively called a fastening bore for receiving the clamping fastener 128). The clamping fastener 128 extends across the slit 126b.

The projection receiving opening 126a defines a pivot axis A4. To adjust the orientation of the bicycle disc brake caliper 36 with respect to the bicycle frame F3, the bicycle disc brake caliper 36 can be pivoted relative to the mounting adapter 66 about the pivot axis A4 as seen in FIGS. 14 and 15. Specifically, if the bicycle disc brake caliper 36 is fixed relative to the mounting adapter 66, then the clamping fastener 128 is loosened to allow the bicycle disc brake caliper 36 to pivot relative to the mounting adapter 66 about the pivot axis A4. Next, a desired mounting position can be obtained by holding the bicycle disc brake caliper 36 in the desired orientation and then screwing in the clamping fastener 128 to tighten the clamping portion 126 around the projection 52a.

To adjust the location of the bicycle disc brake caliper 36 with respect to the bicycle frame F2, the mounting adapter 66 is flipped one hundred and eighty degrees about the mounting plane P from the mounting position shown in FIG. 14 to the mounting position shown in FIG. 16. Specifically, the first mounting axis A1 is spaced by a first distance D1 from the second coupling portion 112 as measured along a minimum straight line connecting the first and second mounting axes A1 and A2. On the other hand, the second mounting axis A2 is spaced by a second distance D2 from the second coupling portion 112 as measured along the minimum straight line. In other words, the first and second distances D1 and D2 are measured from a center portion of the second coupling portion 112 to the first and second mounting axes A1 and A2, respectively. The second distance D2 is greater than the first distance D1. With this configuration, location of the bicycle disc brake caliper 36 can be adjusted with respect to the bicycle frame F3 so that the bicycle disc brake caliper 36 can be used with two different sizes of brake rotors.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

In the present application, the following directional terms "frame facing side", "non-frame facing side", "forward", "rearward", "front", "rear", "up", "down". "above", "below", "upward", "downward", "top", "bottom", "side", "vertical", "horizontal". "perpendicular" and "transverse" as well as any other similar directional terms refer to those directions from on a perspective of a user (e.g., a rider) seated on a saddle of a bicycle and facing a handlebar of a bicycle in an upright, riding position and equipped with the bicycle disc brake caliper assembly. Accordingly, these directional terms, as utilized to describe the bicycle disc brake caliper assembly should be interpreted relative to a bicycle in an upright riding position on a horizontal surface and that is equipped with the bicycle disc brake caliper assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake caliper assembly comprising:
a main caliper body including a first coupling portion configured not to be directly attached to a bicycle frame;
at least one brake pad movably attached to the main caliper body; and
a mounting adapter including a second coupling portion configured to be detachably coupled to the first coupling portion, and a mounting portion configured to be mounted to the bicycle frame,
the first coupling portion of the main caliper body including a projection, and
the second coupling portion of the mounting adapter including a clamp, the clamp having a projection receiving opening to clamp the projection therein, the clamp further having a clamping portion defining the projection receiving opening and a clamping fastener operatively coupled to the clamping portion to adjust a size of the projection receiving opening,
the mounting portion of the mounting adapter including
a first mounting part disposed on a first side of the second coupling portion, the first mounting part including a first mounting bore defining a first mounting axis, and
a second mounting part disposed on a second side of the second coupling portion, the second side being opposite to the first side with respect to the second coupling portion, the second mounting part including a second mounting bore defining a second mounting axis,
the mounting adapter further including a fastening bore for receiving the clamping fastener, the fastening bore extends substantially parallel to the first and second mounting axes.

2. The bicycle disc brake caliper assembly according to claim 1, wherein
the first mounting axis is parallel to the second mounting axis.

3. The bicycle disc brake caliper assembly according to claim 2, wherein
the first mounting axis is spaced by a first distance from the second coupling portion as measured along a minimum straight line connecting the first and second mounting axes, and
the second mounting axis is spaced by a second distance from the second coupling portion as measured along the minimum straight line, the second distance being greater than the first distance.

4. The bicycle disc brake caliper assembly according to claim 1, wherein
the main caliper body includes a hydraulic cylinder in which a piston movably disposed along a movement axis that is non-parallel to the first mounting axis.

5. The bicycle disc brake caliper assembly according to claim 4, wherein
the movement axis is perpendicular to the first mounting axis as seen in a direction perpendicular to both the movement axis and the first mounting axis.

6. The bicycle disc brake caliper assembly according to claim 1, wherein
the first mounting part includes a first bicycle mounting surface having a first opening of the first mounting bore, and
the second mounting part includes a second bicycle mounting surface having a second opening of the second mounting bore, the first and second bicycle mounting surfaces lying in a mounting plane.

7. The bicycle disc brake caliper assembly according to claim 6, wherein
the first mounting bore has a first internal thread engaged with a first external thread of a first fastener, and
the second mounting bore has a second internal thread engaged with a second external thread of a second fastener.

8. The bicycle disc brake caliper assembly according to claim 6, wherein
no portion of the mounting adapter between the first opening and the second opening extends beyond the mounting plane in a direction toward the bicycle frame.

9. The bicycle disc brake caliper assembly according to claim 6, wherein
the mounting adapter has a protruding part between the first opening and the second opening extending beyond the mounting plane in a direction toward the bicycle frame.

10. The bicycle disc brake caliper assembly according to claim 1, wherein the projection receiving opening defines a pivot axis, and the mounting adapter adjustably supports the main caliper body about the pivot axis between at least two different mounting positions.

11. The bicycle disc brake caliper assembly according to claim 1, further comprising an additional mounting adapter having a different mounting portion with respect to the mounting portion of the mounting adapter, the different mounting portion being configured to be mounted to a different bicycle frame with respect to the bicycle frame used with the mounting adapter.

12. A bicycle disc brake caliper assembly comprising:

a main caliper body including a first coupling portion configured not to be directly attached to a bicycle frame;

at least one brake pad movably attached to the main caliper body;

a mounting adapter including a clamping fastener having a tool engagement portion for adjusting a size of a projection receiving opening of the mounting adapter, the mounting adapter being configured to be coupled to the main caliper body by the clamping fastener, the mounting adapter including a second coupling portion configured to be detachably coupled to the first coupling portion, and a mounting portion configured to be mounted to the bicycle frame along a mounting plane of the mounting portion; and at least one additional fastener having a tool engagement portion and extending parallel to the clamping fastener, the tool engagement portion of the clamping fastener being accessible from the same side of the mounting plane as the tool engagement portion of the engagement portion of the at least one additional fastener, the mounting portion of the mounting adapter including a first mounting part disposed on a first side of the second coupling portion, the first mounting part including a first mounting bore defining a first mounting axis, and a second mounting part disposed on a second side of the second coupling portion, the second side being opposite to the first side with respect to the second coupling portion, the second mounting part including a second mounting bore defining a second mounting axis, at least one of the first and second mounting bores receiving the at least one additional fastener, the mounting adapter further including a fastening bore for receiving the clamping fastener, the fastening bore extends substantially parallel to the first and second mounting axes.

13. The bicycle disc brake caliper assembly according to claim 12, wherein the tool engagement portion of the at least one additional fastener is accessible from the same side of the mounting plane.

14. The bicycle disc brake caliper assembly according to claim 12, wherein the tool engagement portion of the at least one additional fastener is accessible from an opposite side of the mounting plane.

* * * * *